US012572749B2

(12) United States Patent
Fayyaz et al.

(10) Patent No.: US 12,572,749 B2
(45) Date of Patent: Mar. 10, 2026

(54) COMPRESSING INFORMATION PROVIDED TO A MACHINE-TRAINED MODEL USING ABSTRACT TOKENS

(71) Applicant: Microsoft Technology Licensing, LLC, Redmond, WA (US)

(72) Inventors: Mohsen Fayyaz, Berlin (DE); Eric Chris Wolfgang Sommerlade, Oxford (GB); Justin James Wagle, Pacifica, CA (US); Vivek Pradeep, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 147 days.

(21) Appl. No.: 18/232,485

(22) Filed: Aug. 10, 2023

(65) Prior Publication Data

US 2025/0053748 A1 Feb. 13, 2025

(51) Int. Cl.
*G06F 40/35* (2020.01)
*G06F 40/284* (2020.01)
*G06N 20/00* (2019.01)

(52) U.S. Cl.
CPC ............ *G06F 40/35* (2020.01); *G06F 40/284* (2020.01); *G06N 20/00* (2019.01)

(58) Field of Classification Search
None
See application file for complete search history.

(56) References Cited

U.S. PATENT DOCUMENTS

| | | | |
|---|---|---|---|
| 2020/0349919 A1* | 11/2020 | Wanas | G10L 15/22 |
| 2021/0217408 A1* | 7/2021 | Hakkani-Tur | G06N 3/02 |
| 2022/0004819 A1 | 1/2022 | Modi et al. | |
| 2023/0214689 A1 | 7/2023 | Tian et al. | |
| 2023/0244938 A1 | 8/2023 | Wei et al. | |
| 2024/0176958 A1* | 5/2024 | Raimondo | G06N 3/0455 |
| 2024/0289362 A1 | 8/2024 | Williams et al. | |
| 2024/0311575 A1* | 9/2024 | Baeuml | G06F 40/56 |
| 2024/0354319 A1* | 10/2024 | Dinu | G06F 16/3329 |
| 2024/0394479 A1* | 11/2024 | Pathak | G06F 40/295 |

(Continued)

FOREIGN PATENT DOCUMENTS

WO 2023022727 A1 2/2023

OTHER PUBLICATIONS

Hegde, Srinidhi, et al. "Variational student: Learning compact and sparser networks in knowledge distillation framework." ICASSP 2020-2020 IEEE International Conference on Acoustics, Speech and Signal Processing (ICASSP). IEEE, 2020. (Year: 2020).*

(Continued)

*Primary Examiner* — Douglas Godbold

(57) ABSTRACT

A technique uses a machine-trained model to generate a response based on a prompt which expresses current input information and abstract token information. The abstract token information summarizes a full dialogue history of a dialogue, and is generated by the model itself. The technique reduces the size of the prompt by incorporating the abstract summary information in lieu of the full dialogue history. A training system trains the machine-trained model by successively improving the predictive accuracy of the machine-trained model, while rewarding the machine-trained model based on an extent to which the machine-trained model compresses instances of abstract token information.

19 Claims, 11 Drawing Sheets

(56) References Cited

U.S. PATENT DOCUMENTS

| | | | |
|---|---|---|---|
| 2025/0005276 A1 | 1/2025 | Bhat et al. | |
| 2025/0005427 A1* | 1/2025 | Venkateswaran ...... | G06N 3/044 |
| 2025/0006052 A1 | 1/2025 | Williams et al. | |
| 2025/0028751 A1* | 1/2025 | Yu ........................... | G06F 40/35 |
| 2025/0086187 A1 | 3/2025 | Mohsen et al. | |

OTHER PUBLICATIONS

Gupta, "Compression of Deep Learning Models for Text: a Survey," arXiv, arXiv:2008.05221v4 [cs. CL], Jun. 13, 2021, 53 pages.

Chen, et al., "Stabilized In-Context Learning with Pre-trained Language Models for Few Shot Dialogue State Tracking," arXiv, arXiv:2302.05932v1 [cs.CL], Feb. 12, 2023, 14 pages.

Santra, et al., "Frugal Prompting for Dialog Models," arXiv, arXiv:2305.14919v1 [cs.CL], May 24, 2023, 22 pages.

PCT Search Report and Written Opinion for PCT/US2024/037265, mailing date Oct. 22, 2024, 17 pages.

International Search Report and Written Opinion received for PCT Application No. PCT/US2024/041380, mailed on Nov. 25, 2024, 14 pages.

Fayyaz, et al., "Executing a Client Model Using a Task Prompt Produced by a Main System," U.S. Appl. No. 18/244,229, filed Sep. 9, 2023, 52 pages.

Gu, et al., "From Server-Based to Client-Based Machine Learning: a Comprehensive Survey," in ACM Computing Surveys, vol. 54, No. 1, Article 6. Dec. 2020, 36 pages.

Office Action received in U.S. Appl. No. 18/244,229, mailing date: Jan. 16, 2025, 31 pages.

Final Office Action mailed on Jun. 9, 2025, in U.S. Appl. No. 18/244,229, 30 pages.

Devlin, et al., "BERT: Pre-training of Deep Bidirectional Transformers for Language Understanding," arXiv, Cornell University, arXiv:1810.04805v2 [cs.CL], May 24, 2019, 16 pages.

Scao, et al., "BLOOM: A 176B-Parameter Open-Access Multilingual Language Model," arXiv, Cornell University, arXiv:2211.05100v2 [cs.CL], Dec. 11, 2022, 62 pages.

Vaswani, et al., "Attention Is All You Need," in 31st Conference on Neural Information Processing Systems (NIPS 2017), 2017, 11 pages.

Brown, et al., "Language Models are Few-Shot Learners," arXiv, Cornell University, arXiv:2005.14165v4 [cs.CL], Jul. 22, 2020, 75 pages.

"Introducing The World's Largest Open Multilingual Language Model: BLOOM," available at https://bigscience.huggingface.co/blog/bloom, accessed on Feb. 13, 2023, 2 pages.

Houlsby, et al., "Parameter-Efficient Transfer Learning for NLP," arXiv, Cornell University, arXiv:1902.00751v2 [cs.LG], Jun. 13, 2019, 13 pages.

Pfeiffer, et al., "AdapterFusion: Non-Destructive Task Composition for Transfer Learning," arXiv, Cornell University, arXiv:2005.00247v3, Jan. 26, 2021, 17 pages.

Pfeiffer, et al., "AdapterHub: a Framework for Adapting Transformers," in Proceedings of the 2020 Conference on Empirical Methods in Natural Language Processing: System Demonstrations, 2020, 9 pages.

Hu, et al., "LoRA: Low-Rank Adaptation of Large Language Models," in Proceedings of 10th International Conference on Learning Representations, Apr. 25, 2022, 13 pages.

Rafailov, et al., "Direct Preference Optimization: Your Language Model is Secretly a Reward Model," arXiv, Cornell University, arXiv:2305.18290v1 [cs.LG], May 29, 2023, 26 pages.

Banino, et al., "PonderNet: Learning to Ponder," in 8th ICML Workshop on Automated Machine Learning (2021), 2021, 16 pages.

Lester, Brian, "Guiding Frozen Language Models with Learned Soft Prompts," available at https://ai.googleblog.com/2022/02/guiding-frozen-language-models-with.html, Google Research Blogs, Feb. 10, 2022, 5 pages.

Lester, et al., "The Power of Scale for Parameter-Efficient Prompt Tuning," arXiv, Cornell University, arXiv:2104.08691v2 [cs.CL], Sep. 2, 2021, 15 pages.

Rao, et al., "DynamicViT: Efficient Vision Transformers with Dynamic Token Sparsification," in 35th Conference on Neural Information Processing Systems (NeurIPS 2021), 2021, 13 pages.

Hu, at al., "LoRA: Low-Rank Adaptation of Large Language Models," arXiv, Cornell University, arXiv:2106.09685v2 [cs.CL], Oct. 16, 2021, 26 pages.

Radford, et al., "Improving Language Understanding by Generative Pre-Training," available at https://cdn.openai.com/research-covers/language-unsupervised/language_understanding_paper.pdf, OpenAI, San Francisco, California, Jun. 11, 2018, 12 pages.

Touvron, et al., "LLaMA: Open and Efficient Foundation Language Models," arXiv, Cornell University, arXiv:2302.13971v1 [cs.CL], Feb. 27, 2023, 27 pages.

Notice of Allowance mailed on Oct. 28, 2025, in U.S. Appl. No. 18/244,229, 16 pages.

* cited by examiner

302 —▶

MACHINE-TRAINED
MODEL
106 ——

POST PROCESSING COMPONENT 424

OUTPUT EMBEDDING INFORMATION 422

426

NTH TRANSFORMER COMPONENT 420

SECOND TRANSFORMER COMPONENT 418

416

ADD & NORMALIZE COMPONENT 2
412

FFN COMPONENT
410

ADD & NORMALIZE COMPONENT 1
408

ATTENTION HEAD 1
414

ATTENTION
COMPONENT
406

FIRST TRANSFORMER
COMPONENT 402

404

428

INITIAL ABSTRACT TOKENS 604

INPUT TOKENS → STUDENT MODEL 508 → PRUNING COMPONENT 606

SURVIVING ABSTRACT TOKENS 608

INPUT TOKENS → STUDENT MODEL 508 → STUDENT-MODEL RESPONSE

602

OTHER INPUT TOKENS

CURRENT SET OF ABSTRACT TOKENS

STUDENT MODEL 508 → PROBABILITY OF HALTING ($\lambda_n$)

NEW ABSTRACT TOKEN FOR PASS n

INPUT TOKENS → STUDENT MODEL 508 → STUDENT-MODEL RESPONSE

702

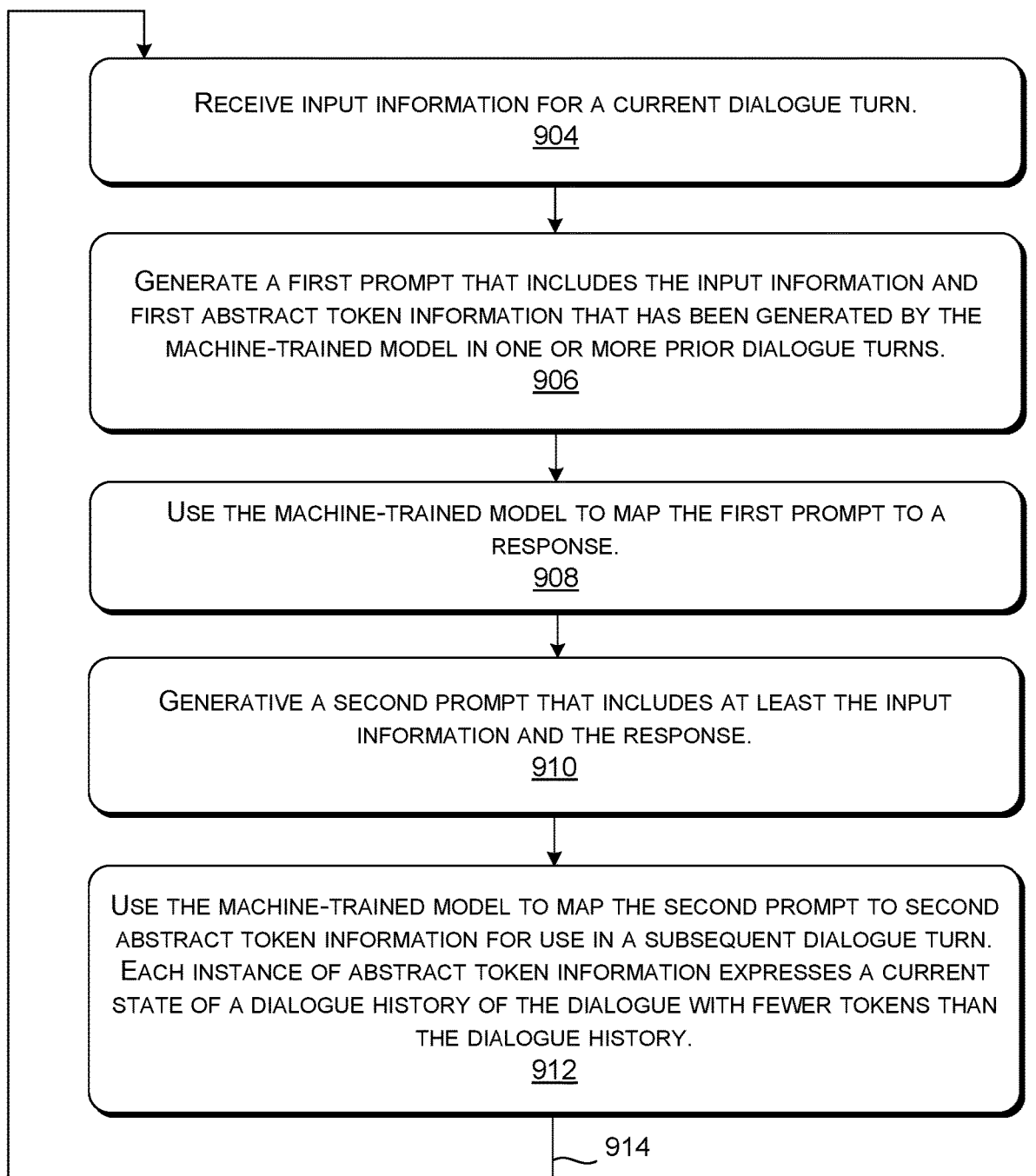

OVERVIEW OF OPERATION OF THE COMPUTING SYSTEM, 902

RECEIVE INPUT INFORMATION FOR A CURRENT DIALOGUE TURN.
904

GENERATE A FIRST PROMPT THAT INCLUDES THE INPUT INFORMATION AND FIRST ABSTRACT TOKEN INFORMATION THAT HAS BEEN GENERATED BY THE MACHINE-TRAINED MODEL IN ONE OR MORE PRIOR DIALOGUE TURNS.
906

USE THE MACHINE-TRAINED MODEL TO MAP THE FIRST PROMPT TO A RESPONSE.
908

GENERATIVE A SECOND PROMPT THAT INCLUDES AT LEAST THE INPUT INFORMATION AND THE RESPONSE.
910

USE THE MACHINE-TRAINED MODEL TO MAP THE SECOND PROMPT TO SECOND ABSTRACT TOKEN INFORMATION FOR USE IN A SUBSEQUENT DIALOGUE TURN. EACH INSTANCE OF ABSTRACT TOKEN INFORMATION EXPRESSES A CURRENT STATE OF A DIALOGUE HISTORY OF THE DIALOGUE WITH FEWER TOKENS THAN THE DIALOGUE HISTORY.
912

OVERVIEW OF OPERATION OF THE TRAINING SYSTEM, 1002

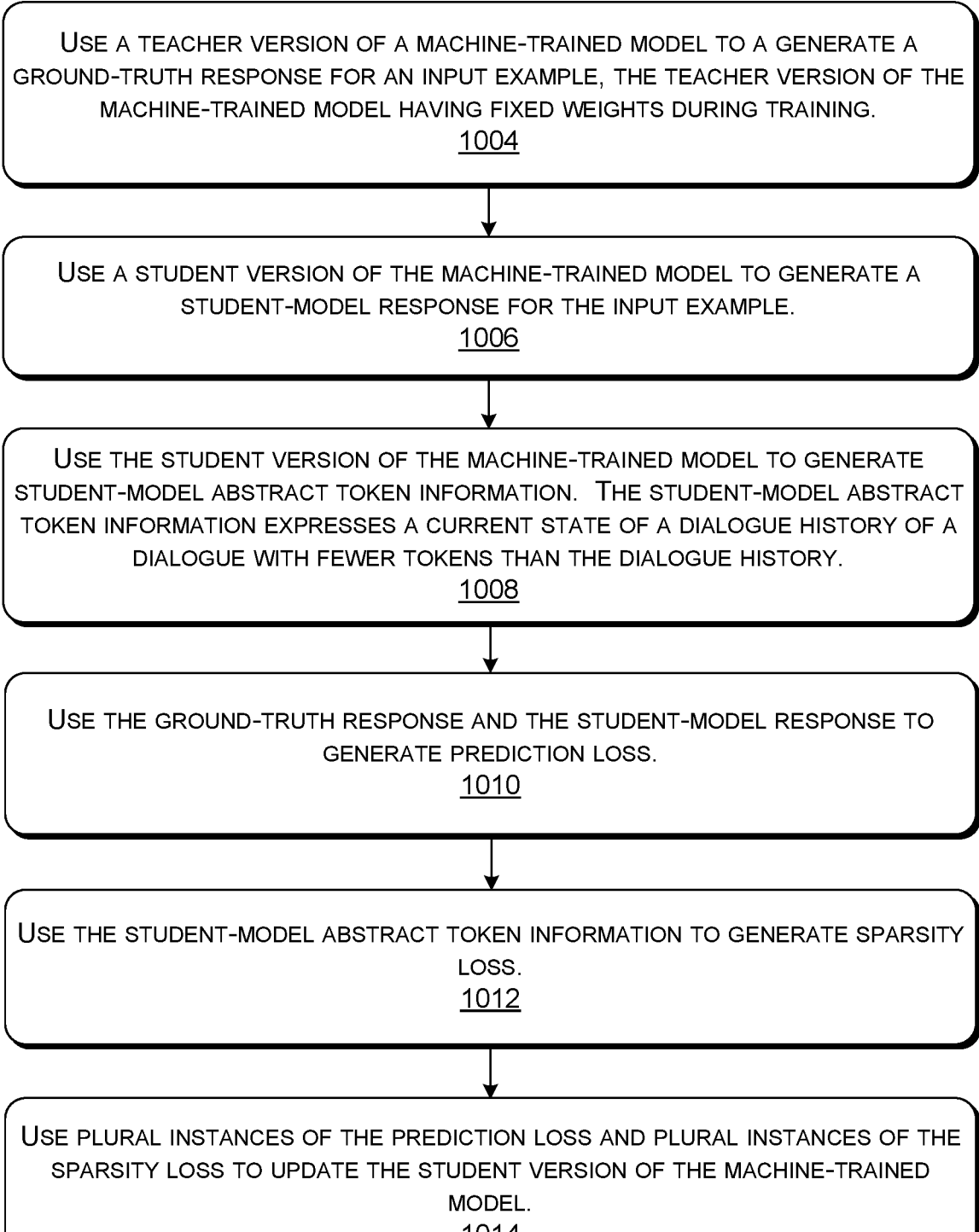

USE A TEACHER VERSION OF A MACHINE-TRAINED MODEL TO A GENERATE A GROUND-TRUTH RESPONSE FOR AN INPUT EXAMPLE, THE TEACHER VERSION OF THE MACHINE-TRAINED MODEL HAVING FIXED WEIGHTS DURING TRAINING.
1004

USE A STUDENT VERSION OF THE MACHINE-TRAINED MODEL TO GENERATE A STUDENT-MODEL RESPONSE FOR THE INPUT EXAMPLE.
1006

USE THE STUDENT VERSION OF THE MACHINE-TRAINED MODEL TO GENERATE STUDENT-MODEL ABSTRACT TOKEN INFORMATION. THE STUDENT-MODEL ABSTRACT TOKEN INFORMATION EXPRESSES A CURRENT STATE OF A DIALOGUE HISTORY OF A DIALOGUE WITH FEWER TOKENS THAN THE DIALOGUE HISTORY.
1008

USE THE GROUND-TRUTH RESPONSE AND THE STUDENT-MODEL RESPONSE TO GENERATE PREDICTION LOSS.
1010

USE THE STUDENT-MODEL ABSTRACT TOKEN INFORMATION TO GENERATE SPARSITY LOSS.
1012

USE PLURAL INSTANCES OF THE PREDICTION LOSS AND PLURAL INSTANCES OF THE SPARSITY LOSS TO UPDATE THE STUDENT VERSION OF THE MACHINE-TRAINED MODEL.
1014

FIG. 10

Figures 11, 12:
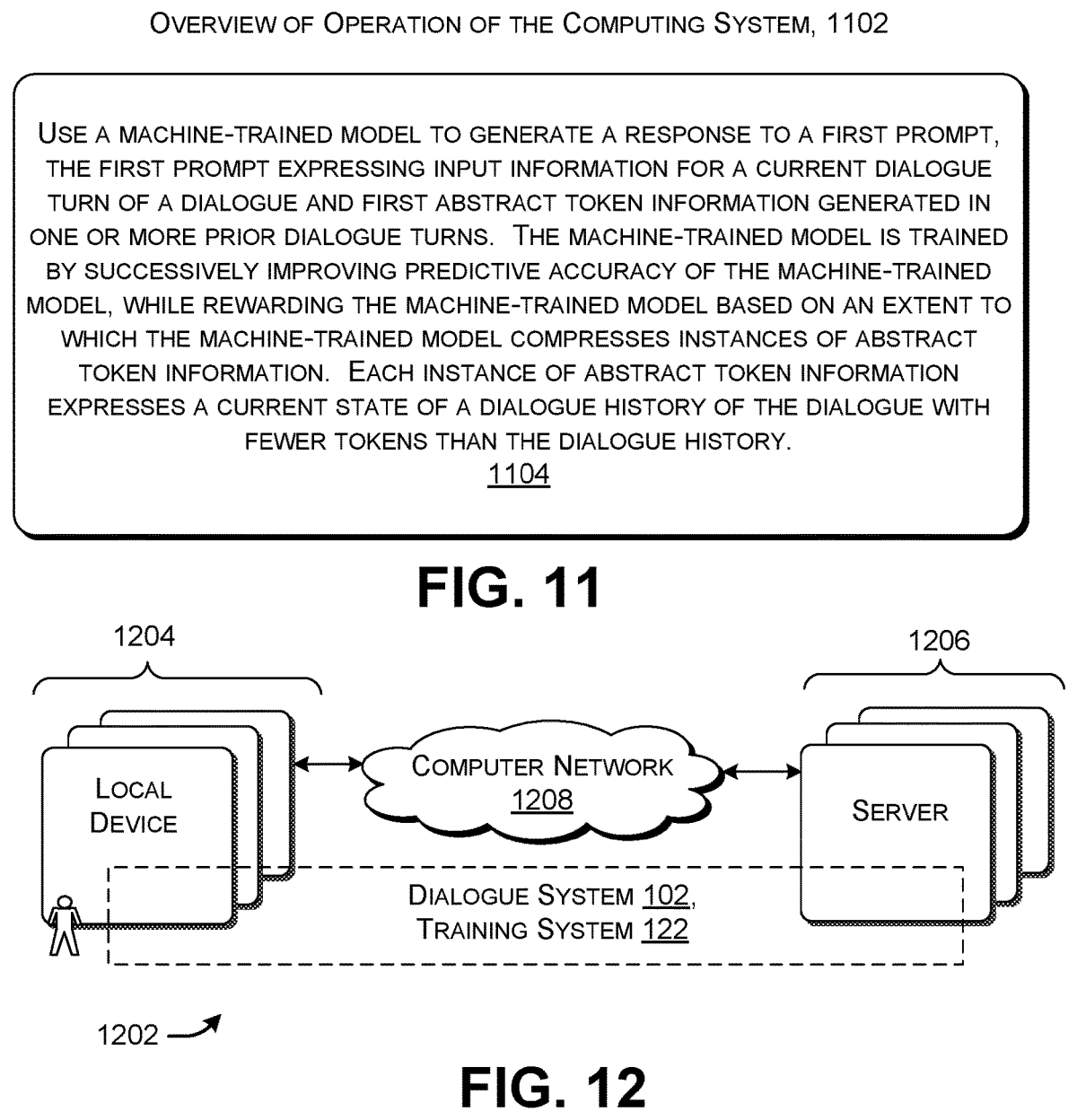

OVERVIEW OF OPERATION OF THE COMPUTING SYSTEM, 1102

USE A MACHINE-TRAINED MODEL TO GENERATE A RESPONSE TO A FIRST PROMPT, THE FIRST PROMPT EXPRESSING INPUT INFORMATION FOR A CURRENT DIALOGUE TURN OF A DIALOGUE AND FIRST ABSTRACT TOKEN INFORMATION GENERATED IN ONE OR MORE PRIOR DIALOGUE TURNS. THE MACHINE-TRAINED MODEL IS TRAINED BY SUCCESSIVELY IMPROVING PREDICTIVE ACCURACY OF THE MACHINE-TRAINED MODEL, WHILE REWARDING THE MACHINE-TRAINED MODEL BASED ON AN EXTENT TO WHICH THE MACHINE-TRAINED MODEL COMPRESSES INSTANCES OF ABSTRACT TOKEN INFORMATION. EACH INSTANCE OF ABSTRACT TOKEN INFORMATION EXPRESSES A CURRENT STATE OF A DIALOGUE HISTORY OF THE DIALOGUE WITH FEWER TOKENS THAN THE DIALOGUE HISTORY.
1104

LOCAL DEVICE

COMPUTER NETWORK
1208

SERVER

DIALOGUE SYSTEM 102,
TRAINING SYSTEM 122

COMPRESSING INFORMATION PROVIDED TO A MACHINE-TRAINED MODEL USING ABSTRACT TOKENS

BACKGROUND

The execution of a language model requires an amount of processing and memory resources that grows with the size of a prompt submitted to the language model. This is because each prompt typically expresses a current query together with a current dialogue history up to a current point in time. To address this issue, an application typically limits the size of each prompt to a predetermined prompt-size limit. That is, an application includes only as much of the recent dialogue history that it can fit into the prompt without exceeding the prompt-size constraint of the language model.

Truncation is not an ideal solution to the above-noted technical resource-related challenges. For example, an application may eliminate relevant parts of a dialogue history that occurred relatively early in a dialogue. Elimination of relevant parts negatively affects the quality of the responses generated by the language model. Further, even with truncation, a language model still consumes a large amount of resources. For this reason, some execution platforms with limited resources, such as local computing devices, may be incapable of feasibly implementing a language model.

SUMMARY

A technique is described herein for using a machine-trained model ("model") to generate a response based on a prompt that expresses current input information and abstract token information. The abstract token information summarizes a dialogue history up to a current point in time in fewer tokens than the full dialogue history itself. The model itself generates the abstract token information.

In some implementations, a single model generates both responses and instances of abstract token information. In other implementations, the model includes a first machine-trained model part that generates responses and a second machine-trained model part that generates the abstract token information.

In some implementations, the technique interleaves the generating of responses with the generating of abstract token information. The model generates a particular response by drawing on the abstract token information produced, at least in part, by an immediately preceding step of generating abstract token information.

According to another illustrative aspect, a training system trains the model by successively improving the predictive accuracy of the model, while rewarding the model based on an extent to which the model compresses instances of abstract token information. According to another illustrative aspect, the training system trains the model by using a teacher-student approach.

The above-summarized technique has the technical merit of reducing the size of each prompt that is fed to the model. As a result, the model is able to process the prompt with reduced resources compared to the traditional case in which each prompt expresses the full dialogue history, up to a model-enforced prompt-size limit. Further, with each dialogue turn, the size of the prompt may increase by just a few abstract tokens. This rate of increase is much smaller than the traditional case in which each prompt expresses all of the tokens of the full dialogue history. This characteristic improves the scalability of the technique, and expands the number of execution environments that can feasibly implement the technique. In particular, the technique's efficient use of memory enables a local computing device with limited resources to implement the technique.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 9 is a flowchart that shows one manner of operation of the dialogue system of FIG. 1 (or FIG. 3) from the perspective a prompt-managing component, which is part of the dialogue systems of FIG. 1 and FIG. 3.

FIG. 10 is a flowchart that shows one manner of operation of the training system of FIG. 5.

FIG. 11 is a flowchart that shows one manner of operation of the dialogue system of FIG. 1 (or FIG. 3) from the perspective of a machine-trained model that generates responses to submitted prompts.

FIG. 12 shows computing equipment that, in some implementations, is used to implement the dialogue system of FIG. 1 (or FIG. 3) and the training system of FIG. 5.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

A. Overview of an Illustrative Dialogue System

Figure 1:
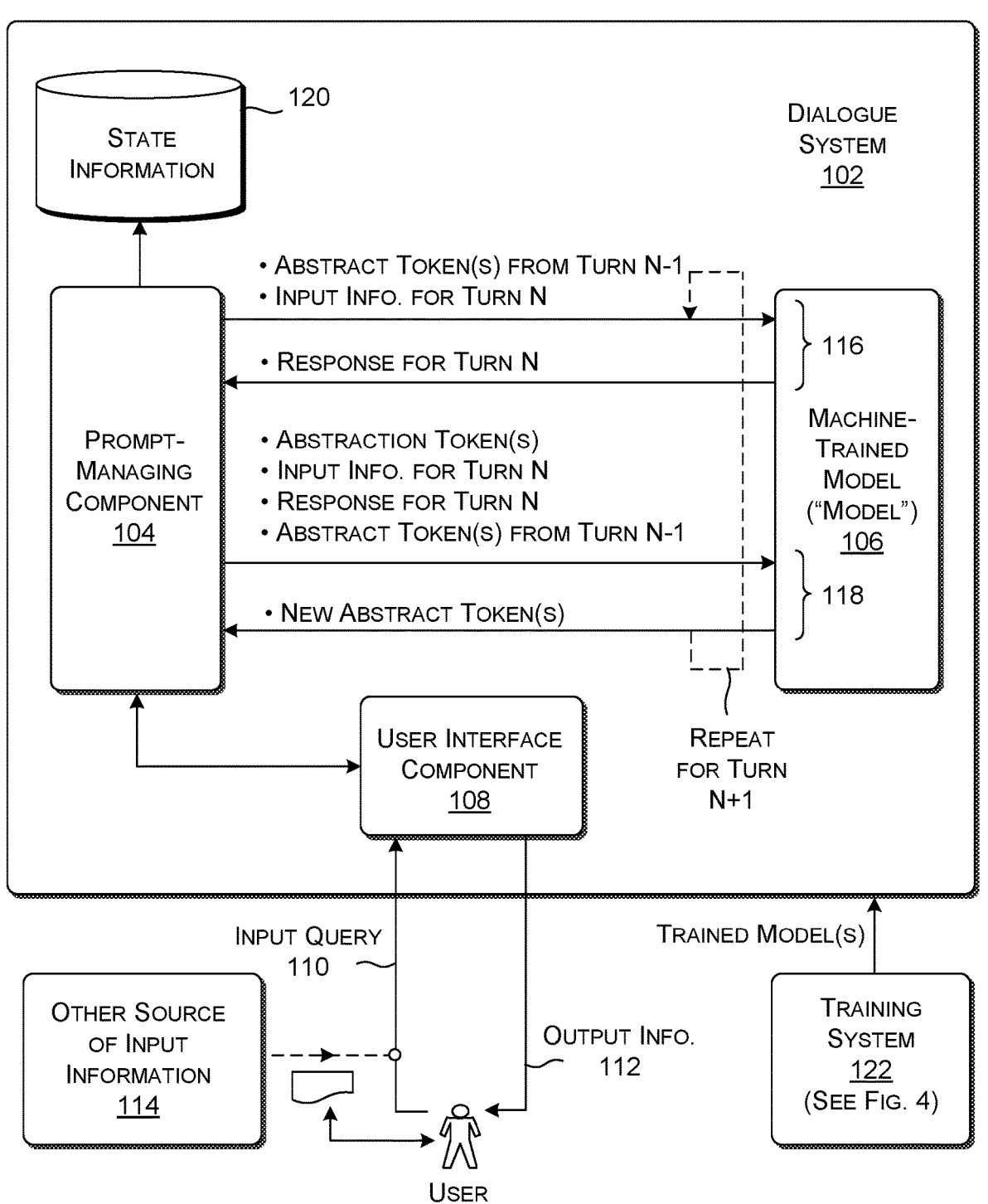
FIG. 1 shows one implementation of a dialogue system that uses a machine-trained model to generate a response based on current input information and abstract token information.

FIG. 1 shows a dialogue system 102 for providing responses to instances of user input information over one or more dialogue turns. The dialogue system 102 includes a prompt-managing component 104 and a machine-trained model ("model" for brevity) 106. The prompt-managing component 104 composes a prompt that includes a current passage of text (e.g., submitted by a user) and abstract token information. The abstract token information summarizes the current state of the full dialogue history, and is included in the prompt in lieu of the full dialogue history. The model 106 provides a response to this prompt. At other times, the model is prompted to generate a new instance of abstract token information.

In some cases, a single computing device or system implements all aspects of the dialogue system 102. For example, a single user computing device of any type implements both the prompt-managing component 104 and the model 106. In other cases, a first computing device implements the prompt-managing component 104, and a second computing device or system implements the model 106. For example, a user computing device implements the prompt-managing component 104 and one or more servers implement the model 106; here, the user computing device interacts with the server(s) via a computer network (not shown) of any type, such as the Internet.

Further note that FIG. 1 shows a particular implementation in which the same model functionality generates both responses and instances of abstract token information. In other implementations (e.g., as described in the context of the explanation of FIG. 3), the machine-trained model 106 includes a response-generating model part that generates responses and an abstract-token-generating model part that generates instances of abstract token information. The response-generating model part and the abstract-token-generating model part can be at the same location or different respective locations. The response-generating model part and the abstract-token-generating model part can have the same size or different respective sizes. The size of a model is a reflection, in part, of the number of weights it uses. To facilitate explanation, it will be assumed below that the same model functionality generates both responses and instances of abstract token information, unless otherwise noted.

Figure 13:
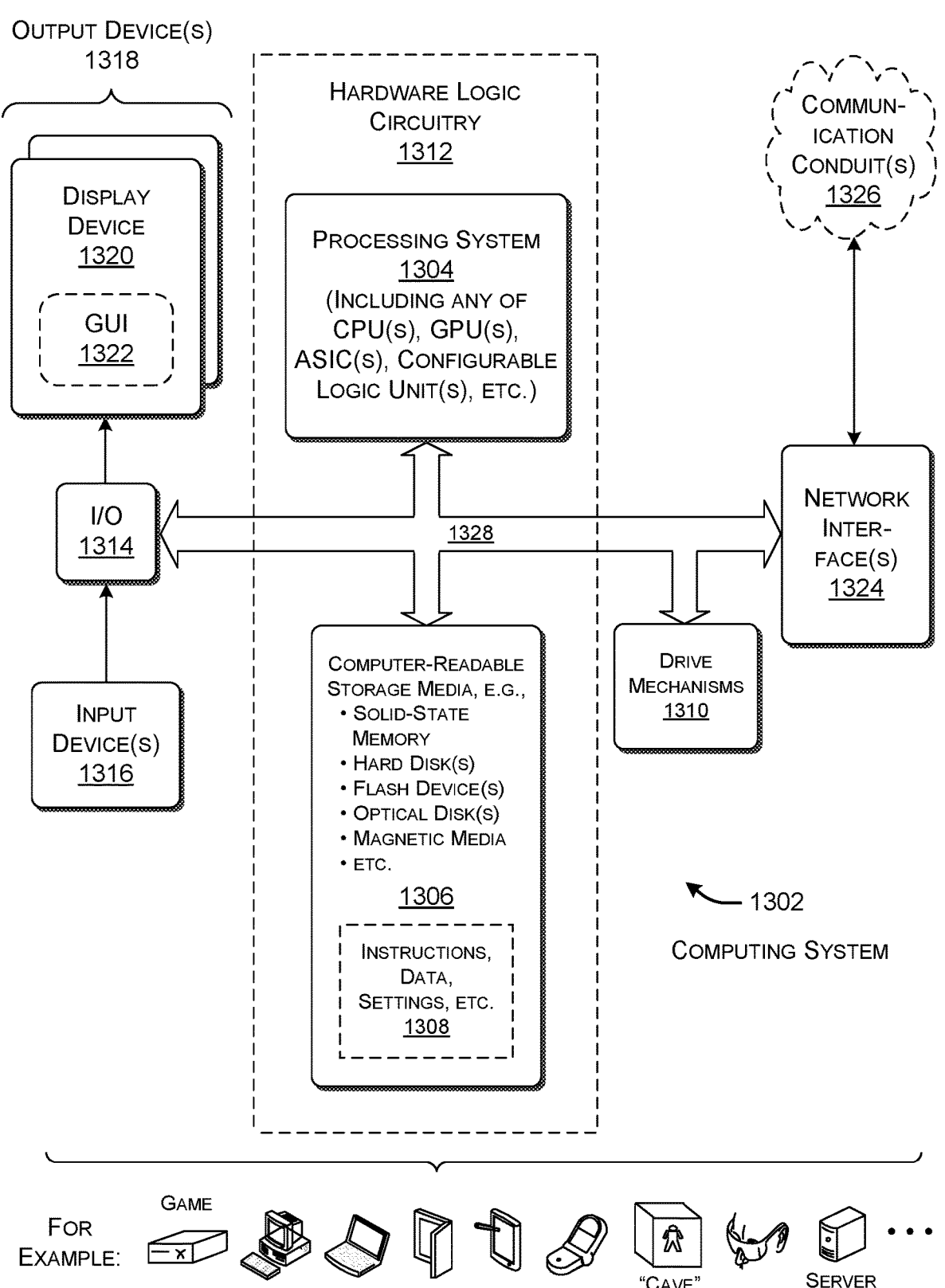
FIG. 13 shows an illustrative type of computing system that, in some implementations, is used to implement any aspect of the features shown in the foregoing drawings.

By way of terminology, a "machine-trained model" refers to computer-implemented logic for executing a task using machine-trained weights that are produced in a training operation. A "weight" refers to any type of parameter value that is iteratively produced by the training operation. A "token" is a unit of information processed by the machine-trained model, such as a word or a part of a word. A "dialogue" refers to a complete transaction of any type that includes one or more dialogue turns. Each dialogue turn involves the submission of input information to the model 106 and the receipt of a response generated by the model 106. In some contexts, terms such as "component," "module," "engine," and "tool" refer to parts of computer-based technology that perform respective functions. FIGS. 12 and 13, described below, provide examples of illustrative computing equipment for performing these functions.

In some implementations, the model 106 is a language model that processes text-based tokens. In other implementations, the model 106 is multi-modal in nature, and is capable of processing any type(s) of tokens. For example, in some implementations, the model 106 processes input information that includes any combination of language-based tokens, image-based tokens, video-based tokens, audio-based tokens, etc. For instance, the prompt-managing component 104 generates image-based tokens by partitioning an image into patches, each of size n×m pixels. To facilitate explanation, however, the following explanation presents examples in which the model 106 processes text-based tokens.

The dialogue system 102 has the following illustrative technical effects by virtue of the manner in which it compresses the dialogue history into abstract token information. First, by reducing the size of prompts over the course of a dialogue, the model 106 is able to generate responses using fewer resources compared to the alternative case in which each prompt expresses all of the tokens of the full dialogue history. The resources include processing-related resources (including central processing unit resources and graphics processing unit resources, etc.), memory resources, communication-related resources, power, etc. Second, the model 106 is able to generate responses in less time compared to the above-noted alternative case. Third, the compression of token information has the effect of improving the quality of the responses generated by the model 106.

The first and second effects follow from the fact that decreasing the amount of tokens fed to the model 106 at each dialogue turn reduces the amount and complexity of processing operations the model 106 is asked to perform. Decreasing the amount and complexity of processing operations, in turn, reduces the amount of resources consumed by the model 106 in processing an instance of input information. Decreasing the amount and complexity of processing operations also shortens the amount of time that is necessary to process an input query. The third effect follows from the fact that the abstract token information summarizes the entirety of the dialogue history, without truncating the dialogue history to accommodate a prompt-size limit of a model. The dialogue system 102 therefore reduces the risk of eliminating relevant information in a prompt.

As a fourth effect, the dialogue system 102 provides a scalable solution to generating responses. This is because the complexity of the prompts produced by the prompt-managing component 104 does not increase as a dialogue proceeds (at least not in the same manner as the traditional approach in which a prompt at any given time expresses the full uncompressed dialogue history). The scalability of the approach enables computing devices having resource-constrained execution platforms to process long dialogues.

As a fifth effect, the dialogue system 102 achieves a way of compressing prompts without significant changes to the architecture of the model 106 (or without any changes to the architecture). This characteristic 102 makes the dialogue system 102 general in nature, insofar as it is applicable to many different kinds of machine-trained models having different architectures.

Continuing with the explanation of FIG. 1, a user interface component 108 provides an interface by which a user or other entity interacts with the dialogue system 102. In some cases, for example, the user interface component 108 receives an input query 110 from a user. The input query 110 includes one or more words that convey a question or other information to which the model 106 is asked to respond. The dialogue system 102 generates output information 112 in response to the input query 110 generated by the model 106. The user interface component 108 delivers the output information 112 to the user in any form, such as a text-based form, a voice-based form, and so on.

In some cases, the user interface component 108 also appends the text provided by any type of document provided by any source 114. For instance, the text corresponds to any of an Email message, document, web page, etc. with which the user is currently interacting. For example, assume that the user is currently viewing a web page that contains a news article. The user's input query 110 states: "What is the city in which this story takes place?" In another scenario, the text corresponds to a document that the user references in the input query 110, without any expectation that the user is currently interacting with this document. For example, the input query 110 states: "What is the budget of the project specified in document XYZ?" The text of any such referenced document becomes a part of the dialogue history that can be compressed using abstract token information.

In some implementations, for each turn of the dialogue, the prompt-managing component 104 interacts with the model 106 in a series of operations summarized in FIG. 1. The operations include a first group 116 of response-generating operations, and a second group 118 of abstract-token-generating operations. The purpose of the response-generating operations is to generate a response to input information. The purpose of the abstract-token-generating operations is to generate an instance of abstract token information for use in a subsequent dialogue turn.

With respect to the response-generating operations, the prompt-managing component 104 first receives an input query 110 ($I_N$), which can include a question and/or a text extracted from a document (or plural documents). These items are collectively referred to as input information below. The prompt-managing component 104 generates a first prompt that includes the input information together with abstract token information ($A_{N-1}$). The abstract token information includes one or more abstract tokens that the model 106 has generated in one or more previous dialogue turns. Second, the prompt-managing component 104 sends the first prompt to the model 106. Third, the model 106 generates a first response ($R_N$) to the first prompt, and forwards the first response to the prompt-managing component 104. The response includes text tokens that constitute a reply to the input information.

With respect to the abstract-token-generating operations, the prompt-generating component 104 first generates a second prompt that includes: a) abstract-token-prompting information; b) the current input information ($I_N$); c) the response $R_N$ generated by the model 106 to the current input information; and d) the abstract token information $A_{N-1}$ produced in one or more prior dialogue turns. The abstract-token-prompting information includes one or more machine-trained abstraction tokens. The prompt-generating component 104 sends the second prompt to the model 106. In response to the second prompt, the model 106 generates new abstract token information ($A_N$) for use in the next dialogue turn, which it sends to the prompt-generating component 104. In doing so, the model 106 interprets the abstract-token-prompting information in the second prompt as a signal that it should generate abstract token information. The dialogue system 102 repeats the above-described operation for each remaining dialogue turn in the dialogue, if any.

A state data store 120 stores summary information. The summary information provides a record of each instance of input information, each response generated by the model 106, each instance of abstract token information generated by the model 106, and the abstract-token-prompting information. The prompt-managing component 104 interacts with the state data store 120 in generating each prompt.

In some implementation, the prompt-management component 104 expresses each abstract token as a distributed vector, or information that can be subsequently mapped into the distributed vector (such as an integer). A distributed vector expresses the semantic content of the dialogue history by distributing information over its k dimensions. A distributed vector is in contrast to a sparse one-hot vector that allocates particular dimensions of the vector to particular concepts. Similarly, each abstraction token can be expressed as a distributed vector. Note that an "abstraction token" is different than an "abstract token." As stated above, the abstract-token-prompting information serves as an invitation or instruction to the model 106 to generate abstract token information. It is produced by a training system and thereafter remains fixed during the inference-stage operation of the model 106. Abstract token information, by contrast, is generated by the model 106 in its inference-stage operation.

More specifically, in some cases, an abstract token represents one or more concepts that are expressed in prior dialogue history. For example, one or more abstract tokens may express a question, "What is the current temperature in Seattle?" that appears in a current dialogue. The model 106 is trained to generate abstract tokens such that the tokens associated with related concepts appear relatively close together in vector space. Further, the model 106 is constrained to generate abstract tokens that do not conflict with text tokens that make up the model's token vocabulary.

A training system 122 trains the language model 106 to execute the behavior described above. The training system 122 also generates the abstraction tokens, which are thereafter fixed. Section C provides further information regarding one implementation of the training system 122.

Figure 2:
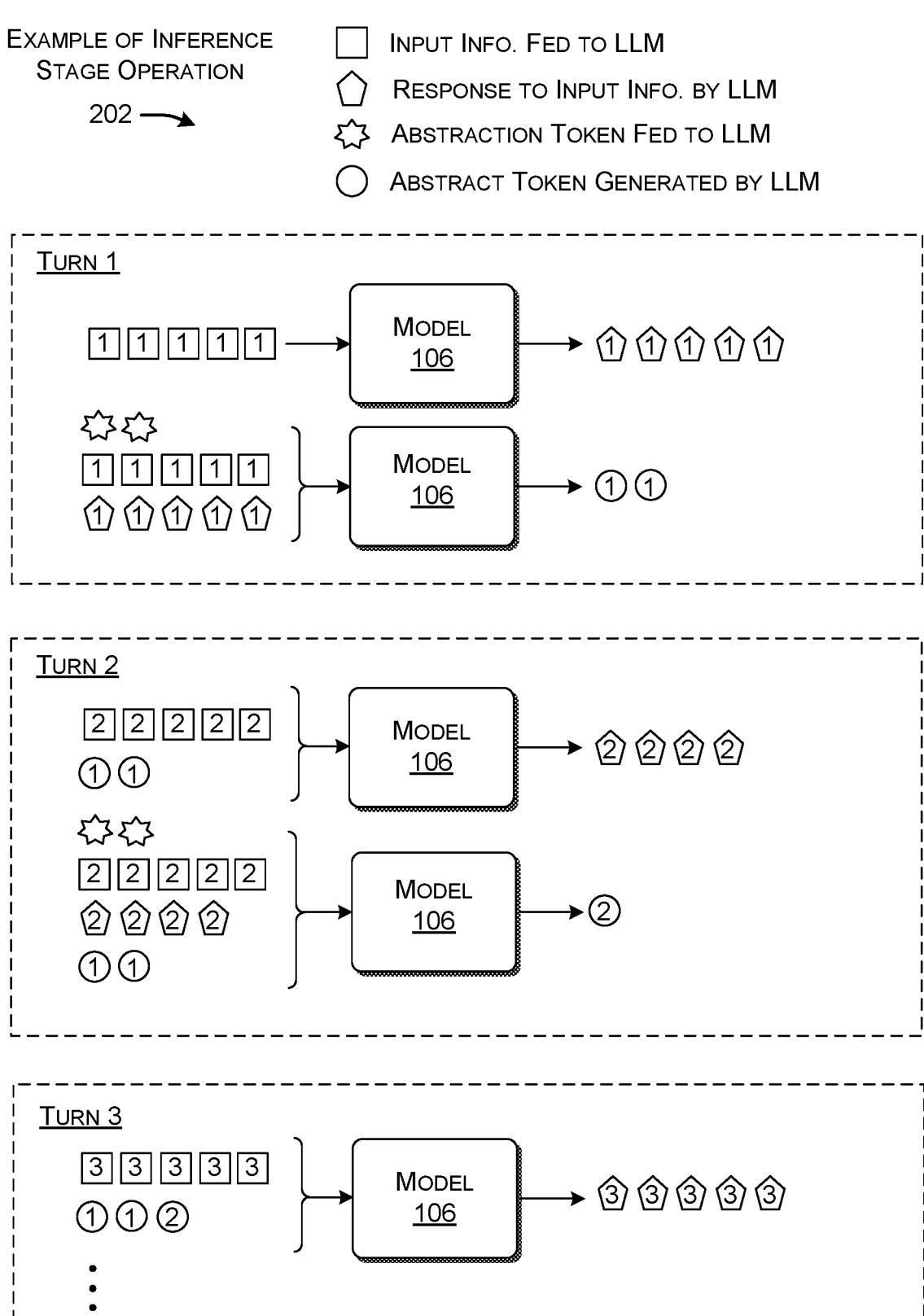
FIG. 2 shows an example of how the dialogue system of FIG. 1 operates in an inference stage.

FIG. 2 shows an example 202 of the inference-stage operation of the dialogue system 102. Inference-stage refers to the manner in which the dialogue system 102 is used in a production system, as opposed to its operation in a training stage. FIG. 2 specifically illustrates the operation of the dialogue system 102 over the first three turns of a dialogue. In each dialogue turn, the dialogue system 102 executes a response-generating operation followed by an abstract-token-generating operation. The top of FIG. 2 shows a key that identifies how to interpret the geometric symbols used in FIG. 2.

In a first dialogue turn, the model 106 receives a prompt that includes first input information provided by a user. The model 106 generates a first response to the prompt. Next, the model 106 receives another prompt that includes a concatenation of: a) abstract-token-prompting information; b) the first input information provided by the user; and c) the first response generated by the model 106. The model 106 responds to this prompt by generating first abstract token information.

More generally, the model 106 generates a number of abstract tokens that are appropriate given the context and complexity of the current state of the dialogue history. A complex topic generally demands more tokens than a simpler topic. Further, in some implementations, the dialogue system 102 constraints the abstract token information to include no more than a maximum number K of tokens.

In a second dialogue turn, the model 106 receives a prompt that includes a concatenation of: a) second input information provided by a user; and b) the first abstract token information produced in the first dialogue turn. The model 106 generates a second response to this prompt. Next, the model 106 receives another prompt that includes a concatenation of: a) the abstract-token-prompting information; b) the second input information provided by the user; c) the second response generated by the model 106; and d) the first abstract token information produced in the first dialogue turn. The model 106 responds to this prompt by generating second abstract token information.

Remaining dialogue turns in the dialogue follow the above-described pattern. For instance, in a third dialogue turn, the model 106 receives a prompt that includes a concatenation of: a) third input information provided by a user; and b) the first and second abstract token information produced in the first and second dialogue turns. The model 106 generates a third response to this prompt. Note that, as the dialogue progresses, the abstract token information may grow in size. But the abstract token information remains significantly smaller than the size of the original dialogue history at any given point in time.

The above approach has a number of technical advantages. For instance, the approach is agnostic to the architecture of the model 106 and the environment in which the model 106 is applied. For instance, the same training processes (described in Section C) can be applied to any type of model. Further, the approach can be applied to different application domains and conversation types. This characteristic promotes the adaptability and scalability of the approach.

Different implementations can vary the operation of the dialogue system 102 in different respective ways. In one variation, given a prompt, the model 106 is trained to generate both a response and an instance of abstract token information, as opposed to serially generating these two items of information, as in the above example. In another variation, when generating a response, the model 106 need not receive every instance of abstract token information that was produced in prior dialogue turns. Rather, in this variation, the model 106 is trained to generate, at any particular point in a dialogue, abstract token information that fully represents the entire dialogue history (including all previously-generated instances of abstract token information). In this case, in the third dialogue turn shown in FIG. 2 it is only necessary to include the abstract token(s) produced in the immediately-preceding dialogue turn (i.e., the second dialogue turn).

Figure 3:
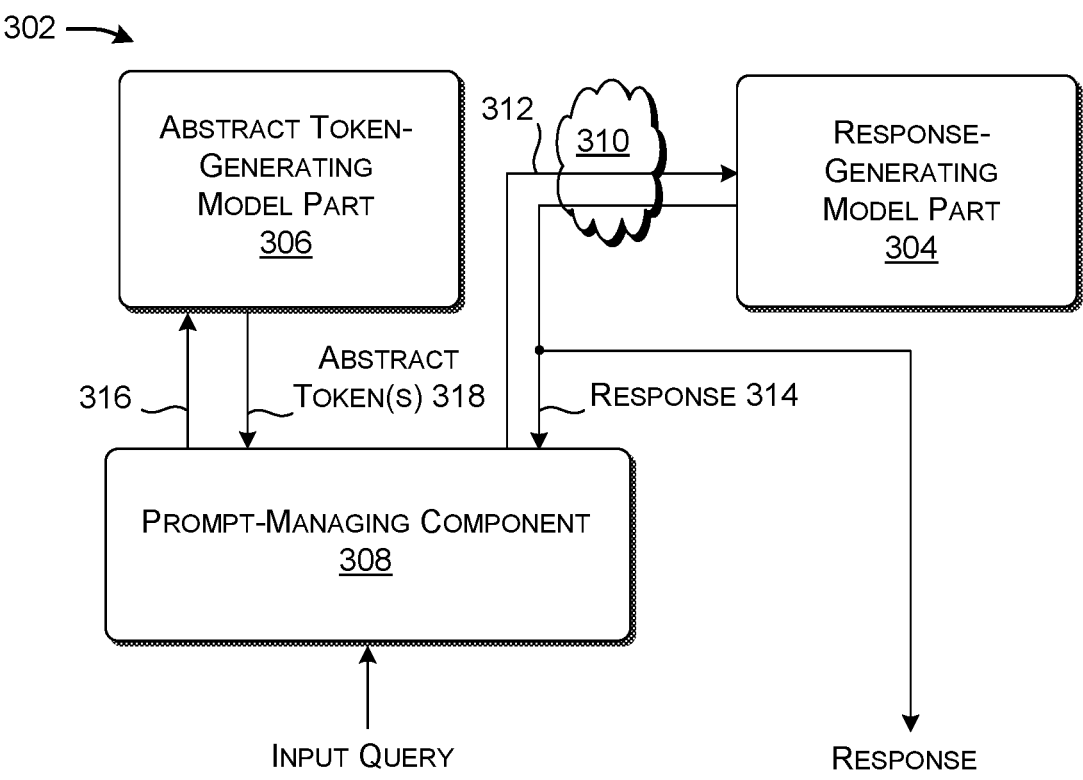
FIG. 3 shows a variation of the dialogue system of FIG. 1.

FIG. 3 shows a dialogue system 302 that represents another variation of the dialogue system 102 of FIG. 1. In this implementation, the model 106 of FIG. 1 includes a response-generating model part 304 and an abstract-token-generating model part 306. The response-generating model part 304 performs the role of generating responses, and the abstract-token-generating model part 306 performs the role of generating instances of abstract token information. A prompt-managing component 308 feeds prompts to both of these model parts (304, 306).

In some implementations, the response-generating model part 304 and the abstract-token-generating model part 306 are collocated, e.g., by being implemented by the same computing system. In other implementations, these two model parts (304, 306) are provided at two different locations and are implemented by different respective computing systems. For example, the abstract-token-generating model part 306 and the prompt-managing component 308 are implemented by a local computing system, and the response-generating model part 304 is implemented by a network-accessible computing system that includes one or more servers. A computer network 310 (e.g., the Internet) communicatively couples the local computing system and the network-accessible computing system.

In some implementations, the response-generating model part 304 and the abstract-token-generating model part 306 have the same size. The size of a model reflects, in part, the number of its weights. In other implementations, the response-generating model part 304 and the abstract-token-generating model part 306 have different sizes. For example, the abstract-token-generating model part 306 can have a smaller size than the response-generating model part 304.

FIG. 3 summarizes illustrative operations that the dialogue system 302 performs. In operations 312 and 314, the prompt-managing component 308 submits a prompt to the response-generating model part 304, and, in response thereto, receives a model response. In operations 316 and 318, the prompt-managing component 308 submits a prompt to the abstract-token-generating model part 306, and, in response thereto, receives an instance of abstract token information. The composition of the prompts is the same as described above with respect to the dialogue system 102 of FIG. 1.

The dialogue system 302 accommodates those cases in which a local computing system implements an application that makes use of language model capabilities, but has limited resources to do so. The dialogue system 302 uses the relatively small abstract-token-generating model part 306 that "fits" on the local computing system. The abstract-token-generating model part 306 reduces the size of prompts, which has the effect of reducing the consumption of resources at the local computing system (such as memory resources). At the same time, the dialogue system 302 leverages the more powerful response-generating model part 304 to produce high-quality responses.

B. Illustrative Machine-Trained Model

Figure 4:
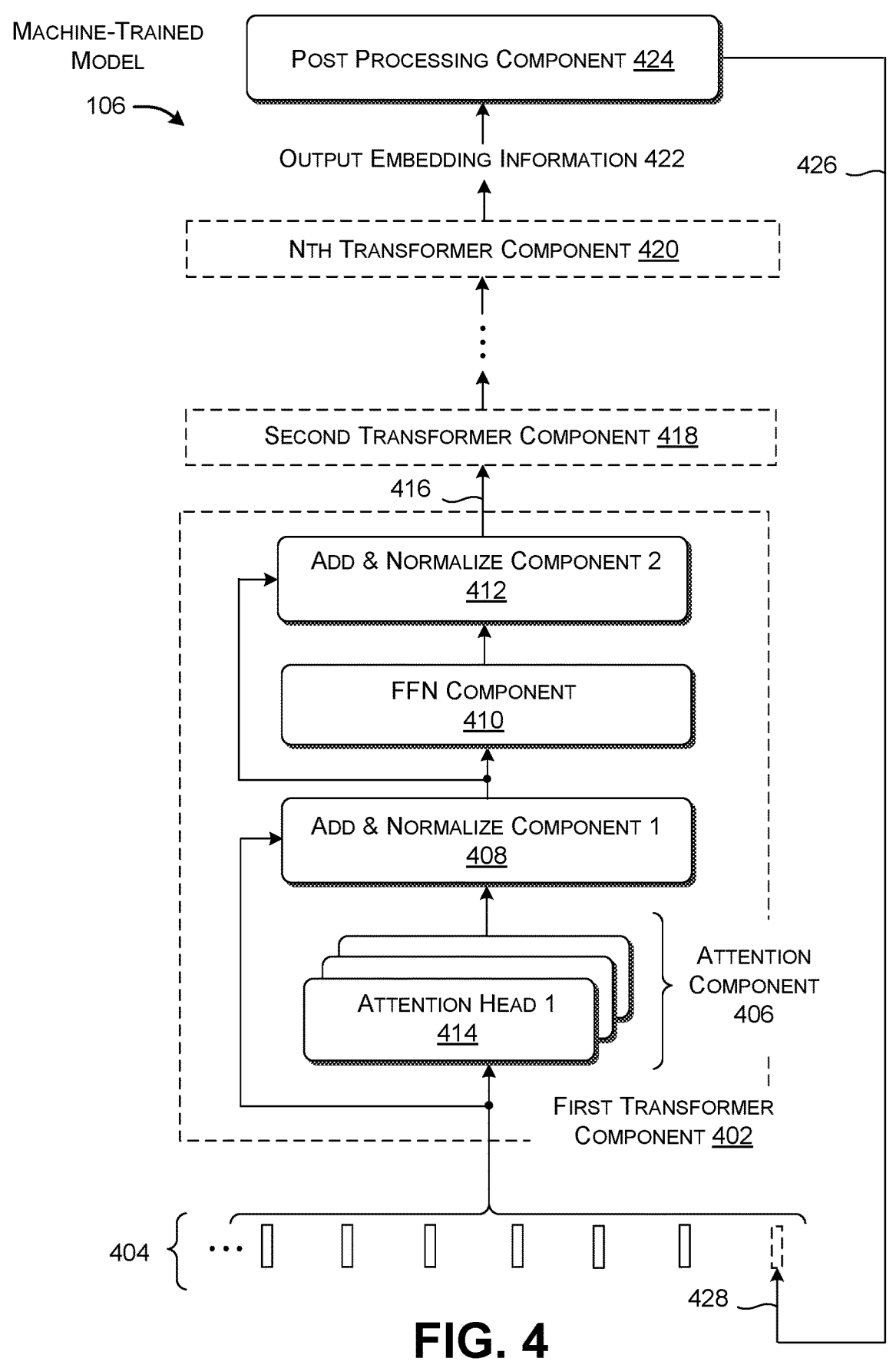
FIG. 4 shows one implementation of a machine-trained model used in the dialogue system of FIG. 1.

FIG. 4 shows one implementation of the machine-trained model 106 of FIG. 1. The model 106 is composed, in part, of a pipeline of transformer components, including a first transformer component 402. FIG. 4 provides details regarding one way to implement the first transformer component 402. Although not specifically illustrated, other transformer components of the model 106 have the same architecture and perform the same functions as the first transformer component 402 (but are governed by separate sets of weights).

The model 106 commences its operation with the receipt of a prompt provided by the prompt-managing component 104. The prompt includes a series of linguistic tokens. In some examples, a "token" refers to a unit of text having any granularity, such as an individual word, a word fragment produced by byte pair encoding (BPE), a character n-gram, a word fragment identified by the WordPiece or SentencePiece algorithm, etc. To facilitate explanation, assume that each token corresponds to a complete word. The principles set forth herein, however, are not limited to the processing of text information; in other examples, the model 106 operates on any of: audio information, image information, video information, sensor information, finance-related information, and so on, or any combination thereof.

Next, an embedding component (not shown) maps the sequence of tokens into respective token embeddings. For example, the embedding component can produce one-hot vectors that describe the tokens, and can then map the one-hot vectors into the token embeddings using a machine-trained linear transformation. The embedding component then adds position information (and, in some cases, segment information) to the respective token embeddings to produce position-supplemented embedding vectors 404. The position information added to each token embedding describes the embedding vector's position in the sequence of token embeddings.

The first transformer component 402 operates on the position-supplemented embedding vectors 404. In some implementations, the first transformer component 402 includes, in order, an attention component 406, a first add-and-normalize component 408, a feed-forward neural network (FFN) component 410, and a second add-and-normalize component 412.

The attention component 406 performs attention analysis using the following equation:

$$attn(Q, K, V) = \text{Softmax}\left(\frac{QK^T}{\sqrt{d}}\right)V. \tag{1}$$

The attention component 406 produces query information Q by multiplying the position-supplemented embedding vectors 404 by a query weighting matrix $W^Q$. Similarly, the attention component 406 produces key information K and value information V by multiplying the position-supplemented embedding vectors 404 by a key weighting matrix $W^K$ and a value weighting matrix $W^V$, respectively. To execute Equation (1), the attention component 406 takes the dot product of Q with the transpose of K, and then divides the dot product by a scaling factor $\sqrt{d}$, to produce a scaled result The symbol d represents the dimensionality of Q and K. The attention component 406 takes the Softmax (normalized exponential function) of the scaled result, and then multiplies the result of the Softmax operation by V, to produce attention output information. More generally stated, the attention component 406 determines how much emphasis should be placed on each part of input embedding information when interpreting other parts of the input embedding information, and when interpreting the same part. In some cases, the attention component 406 is said to perform masked attention insofar as the attention component 406 masks output token information that, at any given time, has not yet been determined. Background information regarding the general concept of attention is provided in Vaswani, et al., "Attention Is All You Need," in 31st Conference on Neural Information Processing Systems (NIPS 2017), 2017, 9 pages.

Note that FIG. 4 shows that the attention component 406 is composed of plural attention heads, including a representative attention head 414. Each attention head performs the computations specified by Equation (1), but with respect to a particular representational subspace that is different than the subspaces of the other attention heads. To accomplish this operation, the attention heads perform the computations described above using different respective sets of query, key, and value weight matrices. Although not shown, the attention component 406 concatenates the output results of the attention component's separate attention heads, and then multiplies the results of this concatenation by another weight matrix $W^O$.

The add-and-normalize component 408 includes a residual connection that combines (e.g., sums) input information fed to the attention component 406 with the output information generated by the attention component 406. The add-and-normalize component 408 then normalizes the output information generated by the residual connection, e.g., by normalizing values in the output information based on the mean and standard deviation of those values. The other add-and-normalize component 412 performs the same functions as the first-mentioned add-and-normalize component 408. The FFN component 410 transforms input information to output information using a feed-forward neural network having any number of layers.

The first transformer component 402 produces output embedding information 416. A series of other transformer components (418, . . . , 420) perform the same functions as the first transformer component 402, each operating on output embedding information produced by its immediately preceding transformer component. Each transformer component uses its own level-specific set of machine-trained weights. The final transformer component 420 in the model 106 produces final output embedding information 422.

A post-processing component 424 performs post-processing operations on the final output embedding information 422. For example, the post-processing component 424 performs a machine-trained linear transformation on the final output embedding information 422, and processes the results of this transformation using a Softmax component (not shown). The model 106 uses the output of the post-processing component 424 to predict the next token in the input sequence of tokens. The model 106 performs this task using a greedy selection approach (e.g., by selecting the token having the highest probability), or by using the beam search algorithm (e.g., by traversing a tree that expresses a search space of candidate next tokens).

In some implementations, the model 106 operates in an auto-regressive manner, as indicated by the loop 426. To operate in this way, the model 106 appends the predicted token to the end of the sequence of input tokens, to provide an updated sequence of tokens. The predicted token leads to the production of a new position-supplemented vector 428. In a next pass, the model 106 processes the updated sequence of position-supplemented vectors to generate a next predicted token. The model 106 repeats the above process until it generates a specified stop token.

The above-described implementation of the model 106 relies on a decoder-only architecture. Other implementations of the model 106 use an encoder-decoder transformer-based architecture. Here, a transformer-based decoder receives encoder output information produced by a transformer-based encoder, together with decoder input information. Other implementations of the model 106 use other kinds of machine-trained models besides, or in addition to, the particular transformer-based architecture shown in FIG. 4. The other machine-trained models include any of convolutional neural networks (CNNs), recurrent neural networks (RNNs), fully-connected feed-forward neural networks (FFNS), stable diffusion models, etc., or any combination thereof.

C. Illustrative Training Systems

Figure 5:
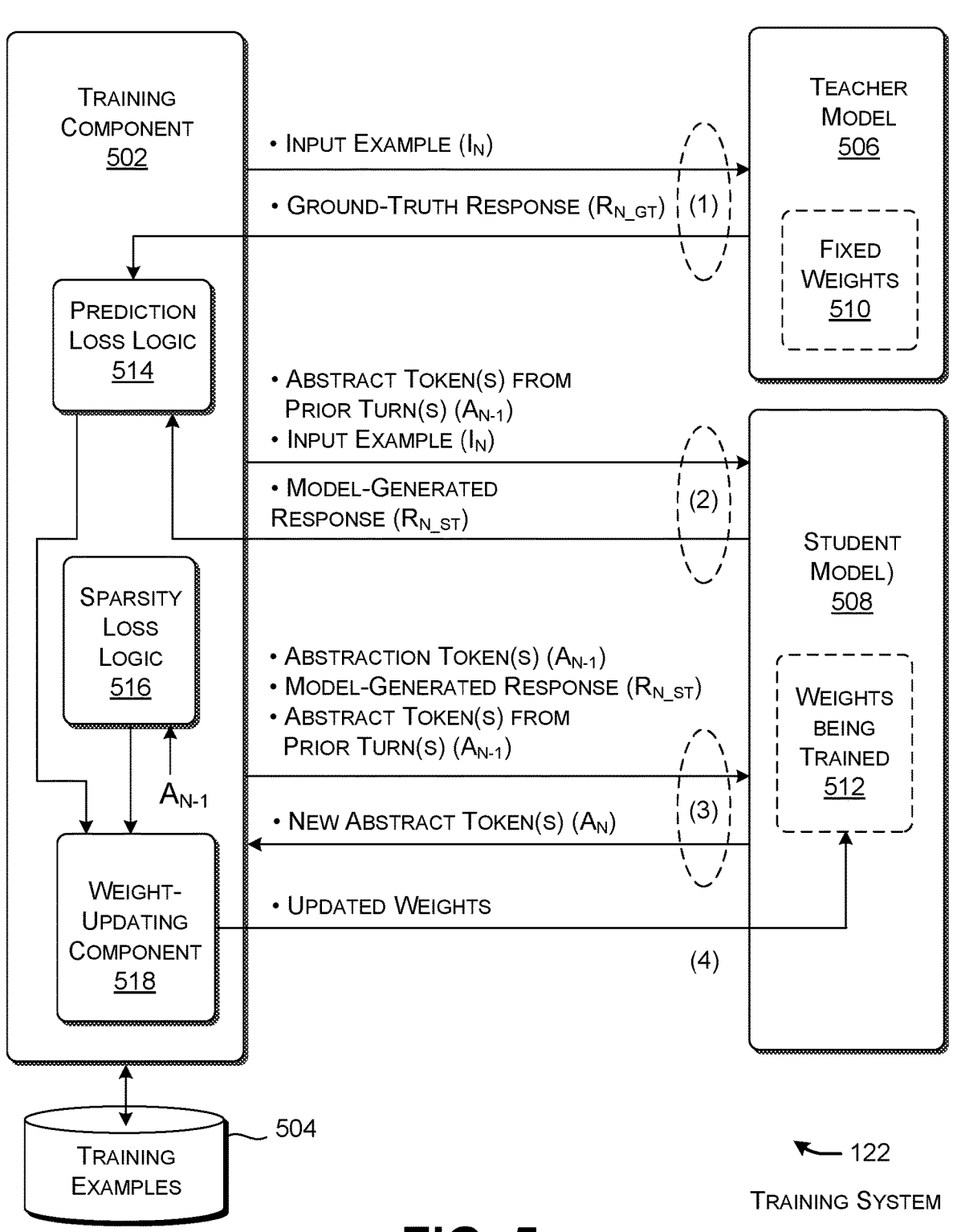
FIG. 5 shows one implementation of a training system for training the machine-trained model used by the dialogue system of FIG. 1 (or FIG. 3).

FIG. 5 shows one example of the training system 122 for training the machine-trained model 106 of FIG. 1. The training system 122 includes a training component 502 for iteratively training the weights of the model 106, based on a set of training examples in a data store 504. In some cases, each training example includes a set of input queries submitted in an actual prior dialogue or a simulated dialogue.

In some implementations, the training component 502 uses a teacher-student approach to train the weights of the model 106. Here, a teacher model 506 and a student model 508 represent two versions of the same model. The teacher model 506 has a set of fixed machine-trained weights 510. The student model 508 has a set of weights 512 that are initialized to be the same as the fixed weights 510 of the teacher model 506. Thereafter, the training component 502 iteratively revises the weights 512 of the student model 508 in the manner described below, to eventually produce the model 106 used in the inference stage. The teacher model 506 serves the role of mapping input examples in the data store 504 into respective instances of ground-truth information. Each instance of ground-truth information provides a teacher-model response to an input query that is considered to be correct by default.

In some implementations, a pre-training system (not shown) pre-trains the teacher model 506 with respect to one or more generic language-model tasks, unrelated to the specific functions performed by the dialogue system 102. (Note that the developer may receive a machine-trained model after the pre-training has been performed by others.) Consider the case in which the teacher model 506 and the student model 508 each represent a large language model. In a first language-modeling task, the pre-training system randomly masks tokens in a sequence of input tokens input to the language model. The pre-training system assesses an extent to which the language model can successfully predict the identities of the masked tokens, and updates the weights of the language model accordingly. In a second language-modeling task, the pre-training system feeds two concatenated sentences to the language model, including a first sentence and a second sentence. The pre-training system then measures an extent to which the language model can successfully predict whether the second sentence properly follows the first sentence (with reference to ground-truth information that indicates whether the second sentence properly follows the first sentence), and then updates the weights of the language model accordingly. Pre-training for generative language models can include unsupervised training using language modeling (e.g., predicting the next word in a given text passage and comparing the prediction with the actual next word) and supervised training (e.g., predicting an output result and comparing the prediction with a ground-truth result). Background on the general task of pre-training language models is provided in Devlin, et al., "BERT: Pre-training of Deep Bidirectional Transformers for Language Understanding," arXiv, Cornell University, arXiv: 1810.04805v2 [cs.CL], May 24, 2019, 16 pages, and Radford, et al., "Improving Language Understanding by Generative Pre-Training," OpenAI, San Francisco, California, Jun. 11, 2018, 12 pages. One example of a publicly-available pre-trained model language model is the BLOOM model available from HUGGING FACE, INC., of New York, New York, one version of which is Version 1.3 released on Jul. 6, 2022.

Figures 6, 7:
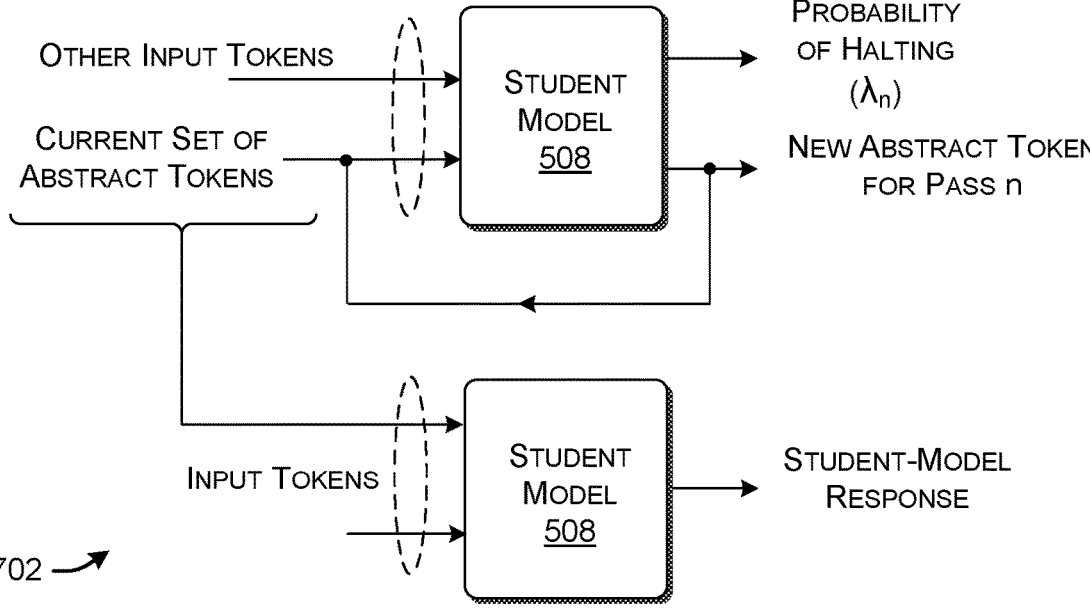
FIG. 6 shows one implementation of logic for calculating prediction loss and sparsity loss in the training system of FIG. 5.
FIG. 7 shows another implementation of logic for calculating prediction loss and sparsity loss in the training system of FIG. 5.

From a high-level perspective, the training component 502 trains the weights 512 of the student model 508 to satisfy two objectives, as governed by a two-part loss function. As a first part, prediction loss logic 514 assesses prediction loss associated with the student model 508. Prediction loss (also referred to as reconstruction loss) measures the difference between the ground-truth responses generated by the teacher model 506 and model-generated responses produced by the student model 508, given the current state of its weights 512. Sparsity loss logic 516 measures sparsity loss. Sparsity loss (also referred to as regularization loss) measures an extent to which the student model 508 is generating succinct abstract token information (which is preferred). FIGS. 6 and 7, described below, show two approaches to calculating prediction loss and sparsity loss. A weight-updating component 518 updates the weights 512 of the student model 508 based on a combination of the prediction loss and sparsity loss.

In some implementations, the training system 122 performs a set of operations in the course of generating an instance of prediction loss and sparsity loss. In a first (1) operation, the training component 502 submits a training example (e.g., a particular input query) ($I_N$) to the teacher model 506, without any of the special tokens described above (e.g., without abstract-token-prompting information or abstract token information). The training example is referred to as an input query below to be concrete. The teacher model 506 responds by using its fixed weights 510 to provide a ground-truth response ($R_{N\_GT}$), which is considered as correct by default.

In a second (2) operation, the training component 502 submits a prompt to the student model 508 that contains the same input query $I_N$ submitted to the teacher model 506. The prompt also includes abstract token information ($A_{N-1}$) produced by one or more prior turns of the current dialogue (if any). The student model 508 generates a student-model response ($R_{N\_ST}$) to this input information. The prediction loss logic 514 measures the difference between the ground-truth response (produced by the teacher model 506) $R_{N\_GT}$ and the student-model response $R_{N\_ST}$. The sparsity loss logic 516 measure sparsity loss based on the abstract token information $A_{N-1}$. The sparsity loss describes an extent to which the abstract token information $A_{N-1}$ is compact.

In a third operation (3), the training component 502 submits another prompt to the student model 508 that concatenates: a) the abstract-token-prompting information; b) the input query $I_N$; c) the student-model response $R_{N\_ST}$; and d) the abstract token information $A_{N-1}$. The student model 508 responds to this prompt by generating a new instance of abstract token information ($A_N$), to be used in a next response-generating operation. In particular, the presence of the abstract-token-prompting information in the prompt informs the student model 508 that it should generate new abstract token information.

In a fourth (4) operation, the weight-updating component 518 adjusts the weights 512 of the student model 508 based on the computed prediction loss and sparsity loss. In actual practice, the training system 122 processes a batch of training examples. Hence, the training system 122 performs the above-described operations for each of the training examples in the batch in parallel, and then updates the weights 512 of the student model 508 based on the results of its processing for the entire batch.

Overall, the training process described above iteratively improves the ability of the student model 508 to generate both accurate responses and succinct abstract token information. A response is accurate insofar as it matches a counterpart ground-truth response. The succinctness objective of the loss function forces the student model 508 to generate succinct abstract token information. At the same time, the accuracy objective of the loss function prevents the compression of the abstract token information from negatively impacting its ability to accurately capture the semantics of the full dialogue history. This combination of objectives results in abstract token information that is maximally expressive and small in size. Viewed from another perspective, the dual objectives of the loss function result in the elimination of redundant information in the full dialogue history.

In some implementations, the training process that is used to train the weights 512 also trains the abstract-token-prompting information, e.g., by iteratively adjusting its values, starting with randomly-initialized values. The abstract-token-prompting information thereafter remains fixed during the inference stage.

The training process described above has a number of technical merits. First, the training process does not require a labeled set of training examples. Instead, the training process uses the teacher model 506 to generate ground-truth information. This approach facilitates the development of the model 106, as it does not require the time, effort, and expense of producing a labeled set of training examples. Second, the training process is applicable to any type of machine-trained model regardless of its architecture, without requiring architectural changes to the machine-trained model. This characteristic further streamlines the development of the model 106.

The training system 122 can train the dialogue system 302 of FIG. 3 in a related manner to that described above. In that case, however, the response-generating model part 304 is dedicated to generating responses, and the abstract-token-generating model part 306 is used to generate abstract token information. In the training stage, both of these model parts (304, 306) learn from each other through their repeated interaction. For instance, the response-generating model part 304 iteratively learns how to interpret instances of abstract token information generated by the abstract-token-generating model part 306. The abstract-token-generating model part 306 simultaneously learns how to formulate instances of abstract token information that enable the response-generating model part 304 to generate correct responses. To facilitate and simplify explanation, however, this section will assume that the student model 508 performs both the roles of generating abstract token information and responses.

FIG. 6 shows an example of logic 602 for calculating sparsity loss. In this case, the student model 508 maps a set of input tokens to an initial set of abstract tokens 604. The set of input tokens includes the elements set forth above with respect to FIG. 5 (e.g., abstract-token-prompting information, an input query $I_{N-1}$, a response $R_{N-1\_ST}$, and any previously-generated abstract token information $A_{N-2}$). A pruning component 606 generates a score for each abstract token in the initial set of abstract tokens 604 that reflects an extent to which the abstract token includes non-redundant information, and therefore should be retained. The pruning component 606 then removes one or more abstract tokens that fail to satisfy a predetermined test. As a result of the above pruning operation, the pruning component 606 produces a revised set of abstract tokens 608, which collectively constitute new abstract token information $A_{N-1}$. (Note that, in this implementation, the logic 602 of FIG. 6 also governs the operation of the model 106 in the inference stage.)

In some implementations, the pruning component 606 uses a fully-connected neural network having one or more layers to transform embeddings associated with the set of initial abstract tokens 604 into transformed token embeddings. The pruning component 606 then uses the Softmax function to assign respective probabilities to the initial set of abstract tokens 604, based on the transformed token embeddings. More specifically, each probability defines the chances that a particular abstract token will be dropped. The pruning component 606 makes a decision whether to omit or keep each token based on these probabilities. A value of 0 is used to represent a decision to omit, and a value of 1 is used to represent a decision to retain. These decisions collectively constitute a mask. The pruning component 606 applies the mask to carry out the actual removal of the rejected abstract tokens, e.g., by multiplying the mask by the embeddings associated with the initial set of abstract token 604. In the next stage of the dialogue, the student model 508 uses the revised set of abstract tokens 608 ($A_{N-1}$), together with a current query ($I_N$), to generate a student-model response $R_{N\_ST}$.

The prediction loss logic 514 compares the student-model response $R_{N\_ST}$ to a ground-truth response $R_{N\_GT}$ (generated by the teacher model 506) to produce prediction loss. The sparsity loss logic 516 compares the number of tokens in the revised set of abstract tokens 608 with a goal-state number of abstract tokens that are desired, to produce sparsity loss. A loss function combines the prediction loss and the sparsity loss in any manner, e.g., by summing them together, to produce a final measure of loss.

FIG. 7 shows other logic 702 that relies on the auto-regressive manner of operation of model 106, as set forth in Section B. More specifically, the model 106 generates the abstract tokens that compose the abstract token information in token-by-token fashion, in plural passes. This also means that the model 106 generates a total number of abstract tokens that depends on the number of iterations it performs. Framed in this context, the technique shown in FIG. 7 attempts to satisfy the dual objective of: (1) generating a set of abstract tokens that accurately summarizes the current state of the dialogue history and which leads to a correct model response, and (2) reducing the number of iterations performed by the model 106, and thus the number of abstract tokens that are generated.

More specifically, for each pass number n, the student model 508 receives a previously-generated set of abstract tokens ($A_{N-2}$) and other input tokens (e.g., $I_{N-1}$, $R_{N-1\_ST}$, and abstract-token-prompting information). In response, the student model 508 is trained to first produce two items of information for the current pass n: (1) an abstract token; and (2) a probability $\lambda$ of halting (where $0 \leq \lambda \leq 1$). The student model 508 then produces a student-model response $R_{N\_ST}$ based on the current set of abstract tokens $A_{N-1}$ (composed of the abstract tokens generated so far at pass n) and an input query ($I_N$). $R_{N\_ST}$ is referred to $\hat{y}_n$ In henceforth to simplify the notation. The training system 502 repeats this process M times. At each iteration, the student model 508 produces a new abstract token and a new model-generated response $\hat{y}_n$.

In some implementations, the training system 602 calculates the total loss L using the following equation:

$$L = \sum_{n=1}^{M} p_n \mathcal{L}(y, \hat{y}_n) + \beta KL(p_n \| p_G(\lambda_p)). \qquad (2)$$

The summation in FIG. 1 is over M stages of iteration that were used to produce the abstract token information, with n referring to a particular pass number of those iterations. The first part of Equation (2) expresses the prediction loss, and the second part of Equation (2) (after the summation) expresses sparsity loss. With respect to the first part of the equation, $\mathcal{L}(y, \hat{y}_n)$ measures the difference between the model-generated response $\hat{y}_n$ and a ground-truth response y (produced by the teacher model 506). More specifically, different implementations can use different measures to express loss, such as cross entropy. In other cases, the training component 502 calculates prediction loss using any type of reinforcement learning algorithm. The symbol $p_n$ used in Equation (2) expresses the product of the probabilities of halting at stage n, and is given by:

$$p_n = \lambda_n \prod_{j=1}^{n-1} (1 - \lambda_j). \qquad (3)$$

With respect to the second part of Equation (2), KL refers to the Kullback-Leibler divergence between two distributions: $p_n$ and $PG(\lambda_p)$. $PG(\lambda_p)$ is a geometric prior distribution, parameterized by the hyper-parameter $\lambda_p$. The geometric prior distribution serves as ground-truth information that guides the reduction in size of the abstract token information. $\beta$ is another hyper-parameter that governs the importance of sparsity in the overall calculation of loss L.

Note that the use of sparsity loss encourages the student model 508 to express the dialogue history using a small number of abstract tokens. But the second part of Equation (2) is balanced by the first part of Equation (2), which penalizes incorrect responses. As a consequence, the student model 508 is forced to learn a small number of abstract tokens that accurately summarize the dialogue history.

Figure 8:
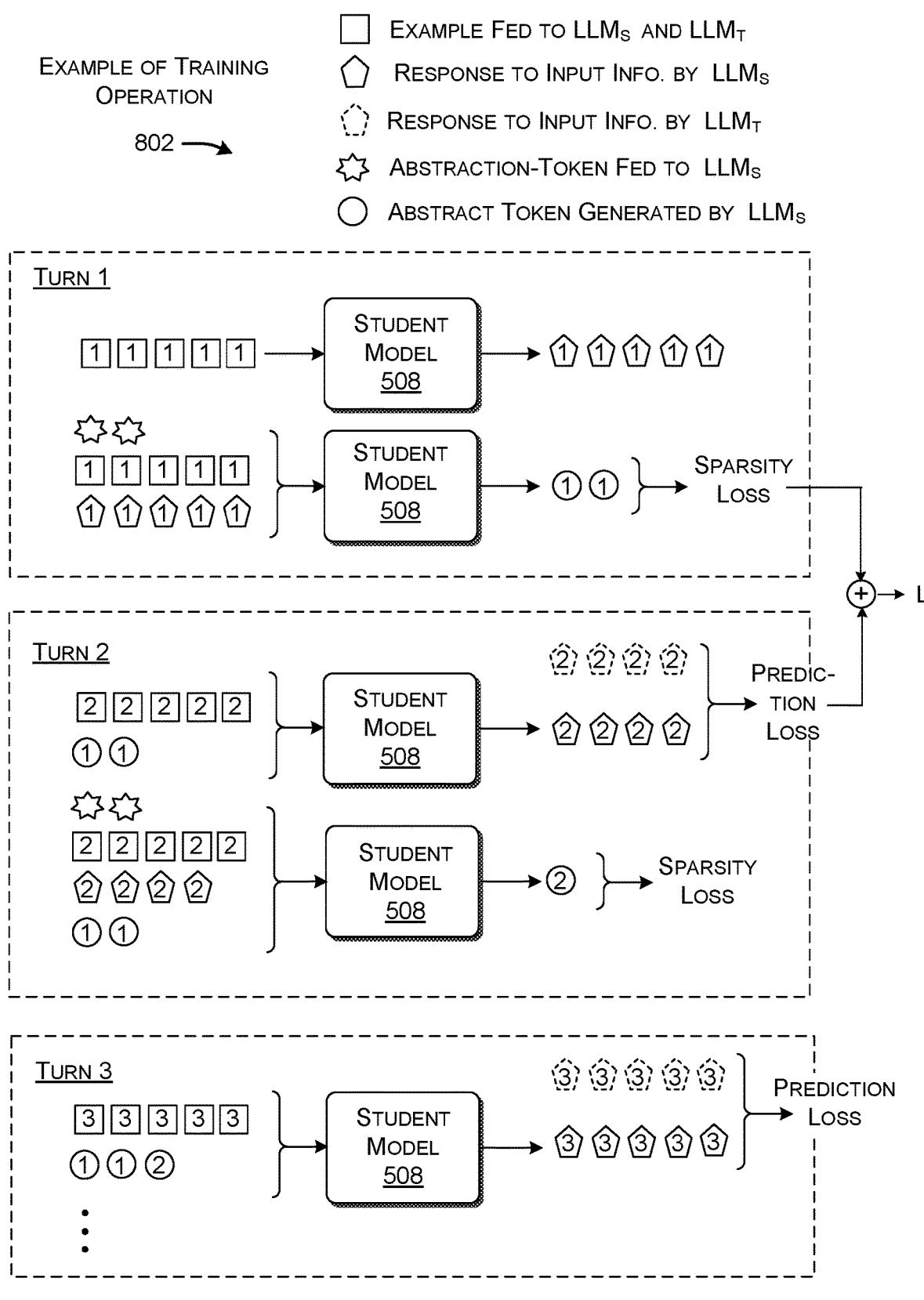
FIG. 8 shows an example of the operation of the training system of FIG. 5.

FIG. 8 shows an example 802 of the operation of the training system 122 for an initial part of a dialogue having three turns. The sequence of operations resembles the inference-stage operations shown in FIG. 2 in the sense that, for each dialogue turn, the training system 122 prompts the student model 508 to generate a response, followed by prompting the student model 508 to generate an instance of abstract token information. Again assume that the same student model 508 generates both instances of abstract token information and responses.

More specifically, in a first dialogue turn, the student model 508 maps an input query to a student-model response. Next, the student model 508 receives a prompt that includes: a) abstract-token-prompting information; b) the input query; c) and the student-model response. The student model 508 responds to this prompt by generating abstract token information. The training component 502 then calculates sparsity loss that assesses the extent to which the abstract token information is compact.

In a second dialogue turn, the student model 508 receives a prompt that contains a current input query together with the abstract token information generated by the student model 508 in the first dialogue turn. The student model 508 maps this prompt to a student-model response. The training component 502 assess the prediction loss for this input query by comparing it to a ground-truth response generated by the teacher model 506. Next, the training component 502 sends another prompt to the student model 508. This prompt includes: a) abstract-token-prompting information; b) the input query submitted in the second turn; c) the student-model response to the input query generated by the student model 508; and d) the abstract token information generated in the first turn. The student model 508 responds to this prompt by generating a new instance of abstract token information. The training component 502 computes sparsity loss based on this new abstract token information.

The training system 122 repeats the above-described operations for each remaining turn of the dialogue. For instance, in the third dialogue turn, the student model 508 receives a prompt that includes a new input query, together with abstract token information generated in the first and second turns. The student model 508 responds to this prompt by generating a new student-model response. The training component 502 compares this student-model response to a ground-truth response generated by the teacher model 506, to produce a measure of prediction loss.

Additional background on the general topic of sparsity loss can be found in Banino, et al., "PonderNet: Learning to Ponder," in 8th ICML Workshop on Automated Machine Learning (2021), 2021, 16 pages, and Rao, et al., "DynamicViT: Efficient Vision Transformers with Dynamic Token Sparsification," in 35th Conference on Neural Information Processing Systems (NeurIPS 2021), 2021, 13 pages.

Other implementations of the training system 122 vary above-described approach in different respective ways. In one variation, instead of training the full set of weights 512 of the student model 508, the training system 122 trains a delta-version of the weights 512. In some cases, for instance, the training system 122 decomposes a full matrix of machine-trained weights at a particular layer of the student model 508 into two smaller matrices, and then trains the smaller matrices in lieu of the full matrix of machine-trained weights. In other cases, the training system 122 trains an adapter layer added to the "top" of a particular layer of the student model 508, while keeping the remainder of the model's weights fixed. Background information on the general topic of training delta versions of machine-trained models can be found at: Hu, at al., "LoRA: Low-Rank Adaptation of Large Language Models," arXiv, Cornell University, arXiv: 2106.09685v2 [cs.CL], Oct. 16, 2021, 26 pages; Houlsby, et al., "Parameter-Efficient Transfer Learning for NLP," arXiv, Cornell University, arXiv: 1902.00751v2 [cs.LG], June 2019, 13 pages; and Pfeiffer, et al., "AdapterFusion: Non-Destructive Task Composition for Transfer Learning," arXiv, Cornell University, 2005.00247v3 [cs.CL], Jan. 26, 2021, 17 pages.

D. Illustrative Processes

FIGS. 9-11 show three processes that represent an overview of the operation of the dialogue system 102 of FIG. 1. Each of the processes is expressed as a series of operations performed in a particular order. But the order of these operations is merely representative, and the operations are capable of being varied in other implementations. Further, any two or more operations described below can be performed in a parallel manner. In one implementation, the blocks shown in the processes that pertain to processing-related functions are implemented by the computing equipment described in connection with FIGS. 12 and 13.

More specifically, FIG. 9 shows a process 902 for interacting with a machine-trained model (e.g., the model 106) over plural dialogue turns of a dialogue. In block 904, the dialogue system 102 receives input information for a current dialogue turn. In block 906, the dialogue system 102 generates a first prompt that includes the input information and first abstract token information that has been generated by the machine-trained model in one or more prior dialogue turns. In block 908, the dialogue system 102 uses the machine-trained model to map the first prompt to a response. In block 910, the dialogue system 102 generates a second prompt that includes at least the input information and the response. In block 912, the dialogue system 102 uses the machine-trained model to map the second prompt to second abstract token information for use in a subsequent dialogue turn. The loop 914 indicates that the dialogue system 102 repeats the above-described operations one or more times in the course of a dialogue. Each instance of abstract token information expresses a current state of a dialogue history of the dialogue with fewer tokens than the dialogue history.

FIG. 10 shows a process 1002 that describes one manner of operation of the training system 122. In block 1004, the training system 122 uses a teacher version of a machine-trained model (e.g., the teacher model 506) to generate a ground-truth response for an input example, the teacher version of the machine-trained model having fixed weights during training. In block 1006, the training system 122 uses a student version of the machine-trained model (e.g., the student model 508) to generate a student-model response for the input example. In block 1008, the training system 122 uses the student version of the machine-trained model to generate student-model abstract token information. The student-model abstract token information expresses a current state of a dialogue history of a dialogue with fewer tokens than the dialogue history. In block 1010, the training system 122 uses the ground-truth response and the student-model response to generate prediction loss. In block 1012, the training system 122 uses the student-model abstract token information to generate sparsity loss. In block 1014, the training system 122 uses plural instances of the prediction loss and plural instances of the sparsity loss to update the student version of the machine-trained model.

FIG. 11 shows a process 1102 for generating responses from the "standpoint" of a machine-trained model (e.g., the model 106). In block 1104, the machine-trained model generates a response to a first prompt, the first prompt expressing input information for a current dialogue turn of a dialogue and first abstract token information generated in one or more prior dialogue turns. The machine-trained model is trained by successively improving predictive accuracy of the machine-trained model, while rewarding the machine-trained model based on an extent to which the machine-trained model compresses instances of abstract token information. Each instance of abstract token information expresses a current state of a dialogue history of the dialogue with fewer tokens than the dialogue history.

E. Illustrative Computing Functionality

FIG. 12 shows computing equipment 1202 that, in some implementations, is used to implement the dialogue system 102 and the training system 122 of FIG. 1. The computing equipment 1202 includes a set of local devices 1204 coupled to a set of servers 1206 via a computer network 1208. Each local device corresponds to any type of computing device, including any of a desktop computing device, a laptop computing device, a handheld computing device of any type (e.g., a smartphone or a tablet-type computing device), a mixed reality device, an intelligent appliance, a wearable computing device (e.g., a smart watch), an Internet-of-Things (IoT) device, a gaming system, an immersive "cave," a media device, a vehicle-borne computing system, any type of robot computing system, a computing system in a manufacturing system, etc. In some implementations, the computer network 1208 is implemented as a local area network, a wide area network (e.g., the Internet), one or more point-to-point links, or any combination thereof.

The dashed-line box in FIG. 12 indicates that the functionality of the dialogue system 102 is capable of being spread across the local devices 1204 and/or the servers 1206 in any manner. Likewise, the functionality of the training system 122 is capable of being distributed over the local devices and/or the servers 1206 in any manner. For instance, in some cases, each local device, or a group of affiliated local devices, implements the entirety the dialogue system 102. In other implementations, the servers 1206 implement the entirety of the dialogue system 102. Here, an individual user interacts with the servers 1206 via a browser application or other local functionality provided by a local device. In other implementations, the functions of the computing system 1202 are distributed between each local device and the servers 1206. For example, in one case, the servers 1206 implement the model 106 and each user computing device implements an instance of the prompt-managing component 104. The dialogue system 102 of FIG. 3 shows another strategy for distributing functionality between a local computing device and the servers 1206.

FIG. 13 shows a computing system 1302 that, in some implementations, is used to implement any aspect of the mechanisms set forth in the above-described figures. For instance, in some implementations, the type of computing system 1302 shown in FIG. 13 is used to implement any local computing device or any server shown in FIG. 12. In all cases, the computing system 1302 represents a physical and tangible processing mechanism.

The computing system 1302 includes a processing system 1304 including one or more processors. The processor(s) include one or more central processing units (CPUs), and/or one or more graphics processing units (GPUs), and/or one or more application specific integrated circuits (ASICs), and/or one or more neural processing units (NPUs), and/or one or more tensor processing units (TPUs), etc. More generally, any processor corresponds to a general-purpose processing unit or an application-specific processor unit.

The computing system 1302 also includes computer-readable storage media 1306, corresponding to one or more computer-readable media hardware units. The computer-readable storage media 1306 retains any kind of information 1308, such as machine-readable instructions, settings, model weights, and/or other data. In some implementations, the computer-readable storage media 1306 includes one or more solid-state devices, one or more magnetic hard disks, one or more optical disks, magnetic tape, etc. Any instance of the computer-readable storage media 1306 uses any technology for storing and retrieving information. Further, any instance of the computer-readable storage media 1306 represents a fixed or removable unit of the computing system 1302. Further, any instance of the computer-readable storage media 1306 provides volatile and/or non-volatile retention of information.

More generally, any of the storage resources described herein, or any combination of the storage resources, is to be regarded as a computer-readable medium. In many cases, a computer-readable medium represents some form of physical and tangible entity. The term computer-readable medium also encompasses propagated signals, e.g., transmitted or received via a physical conduit and/or air or other wireless medium. However, the specific term "computer-readable storage medium" or "storage device" expressly excludes propagated signals per se in transit, while including all other forms of computer-readable media; a computer-readable storage medium or storage device is "non-transitory" in this regard.

The computing system 1302 utilizes any instance of the computer-readable storage media 1306 in different ways. For example, in some implementations, any instance of the computer-readable storage media 1306 represents a hardware memory unit (such as random access memory (RAM)) for storing information during execution of a program by the computing system 1302, and/or a hardware storage unit (such as a hard disk) for retaining/archiving information on a more permanent basis. In the latter case, the computing system 1302 also includes one or more drive mechanisms 1310 (such as a hard drive mechanism) for storing and retrieving information from an instance of the computer-readable storage media 1306.

In some implementations, the computing system 1302 performs any of the functions described above when the processing system 1304 executes computer-readable instructions stored in any instance of the computer-readable storage media 1306. For instance, in some implementations, the computing system 1302 carries out computer-readable instructions to perform each block of the processes described with reference to FIGS. 9-11. FIG. 13 generally indicates that hardware logic circuitry 1312 includes any combination of the processing system 1304 and the computer-readable storage media 1306.

In addition, or alternatively, the processing system 1304 includes one or more other configurable logic units that perform operations using a collection of logic gates. For instance, in some implementations, the processing system 1304 includes a fixed configuration of hardware logic gates, e.g., that are created and set at the time of manufacture, and thereafter unalterable. In addition, or alternatively, the processing system 1304 includes a collection of programmable hardware logic gates that are set to perform different application-specific tasks. The latter category of devices includes programmable array logic devices (PALs), generic array logic devices (GALs), complex programmable logic devices (CPLDs), field-programmable gate arrays (FPGAs), etc. In these implementations, the processing system 1304 effectively incorporates a storage device that stores computer-readable instructions, insofar as the configurable logic units are configured to execute the instructions and therefore embody or store these instructions.

In some cases (e.g., in the case in which the computing system 1302 represents a user computing device), the computing system 1302 also includes an input/output interface 1314 for receiving various inputs (via input devices 1316), and for providing various outputs (via output devices 1318). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers and/or gyroscopes), etc. In some implementations, one particular output mechanism includes a display device 1320 and an associated graphical user interface presentation (GUI) 1322. The display device 1320 corresponds to a liquid crystal display device, a light-emitting diode display (LED) device, a cathode ray tube device, a projection mechanism, etc. Other output devices include a printer, one or more speakers, a haptic output mechanism, an archival mechanism (for storing output information), etc. In some implementations, the computing system 1302 also includes one or more network interfaces 1324 for exchanging data with other devices via one or more communication conduits 1326. One or more communication buses 1328 communicatively couple the above-described units together.

The communication conduit(s) 1326 is implemented in any manner, e.g., by a local area computer network, a wide area computer network (e.g., the Internet), point-to-point connections, or any combination thereof. The communication conduit(s) 1326 include any combination of hardwired links, wireless links, routers, gateway functionality, name servers, etc., governed by any protocol or combination of protocols.

FIG. 13 shows the computing system 1302 as being composed of a discrete collection of separate units. In some cases, the collection of units corresponds to discrete hardware units provided in a computing device chassis having any form factor. FIG. 13 shows illustrative form factors in its bottom portion. In other cases, the computing system 1302 includes a hardware logic unit that integrates the functions of two or more of the units shown in FIG. 13. For instance, in some implementations, the computing system 1302 includes a system on a chip (SoC or SOC), corresponding to an integrated circuit that combines the functions of two or more of the units shown in FIG. 13.

The following summary provides a set of illustrative examples of the technology set forth herein.

(A1) According to one aspect, a method (e.g., the process 902) is described for interacting with a machine-trained model (e.g., the model 106) over plural dialogue turns of a dialogue. The method includes: receiving (e.g., in block 904) input information for a current dialogue turn; generating (e.g., in block 906) a first prompt that includes the input information and first abstract token information that has been generated by the machine-trained model in one or more prior dialogue turns; using (e.g., in block 908) the machine-trained model to map the first prompt to a response; generating (e.g., in block 910) a second prompt that includes at least the input information and the response; and using (e.g., in block 912) the machine-trained model to map the second prompt to second abstract token information for use in a subsequent dialogue turn. The receiving, generating a first prompt, using the machine-trained model to map the first prompt, generating a second prompt, and using the machine-trained model to map the second prompt are repeated at least one time. Each instance of abstract token information expresses a current state of a dialogue history of the dialogue with fewer tokens than the dialogue history.

(A2) According to some implementations of the method of A1, the machine-trained model has two parts, including a response-generating model part and an abstract-token-generating model part.

(A3) According to some implementations of the methods of A1 or A2, the abstract-token-generating model part has a smaller size than the response-generating model part.

(A4) According to some implementations of the method of A3, the abstract-token-generating model part is implemented by a local computing system and the response-generating model part is implemented by a network-accessible computing system.

(A5) According to some implementations of any of the methods of A1-A4, the machine-trained model is a language model that includes attention logic for processing input embedding information by determining relevance of a first part of the input embedding information when interpreting a second part of the input embedding information.

(A6) According to some implementations of any of the methods of A1-A5, the first abstract token information includes one more abstract tokens generated by the machine-trained model.

(A7) According to some implementations of any of the methods of A1-A6, the second prompt also includes the first abstract token information.

(A8) According to some implementations of any of the methods of A1-A7, the second prompt also includes machine-trained abstract-token-prompting information, the machine-trained model interpreting the abstract-token-prompting information as a signal that the machine-trained model is to generate the second abstract token information. Further, the abstract-token-prompting information includes one more abstraction tokens.

(A9) According to some implementations of any of the methods of A1-A8, the input information expresses an input query and text extracted from a document.

(A10) According to some implementations of any of the methods of A1-A9, the method further includes training the machine-trained model by successively improving predictive accuracy of the machine-trained model, while rewarding the machine-trained model based on an extent to which the machine-trained model compresses instances of abstract token information.

(A11) According to some implementations of any of the methods of A1-A9, the method further includes training the machine-trained model by: using a teacher version of the machine-trained model to a generate ground-truth response for an input example, the teacher version of the machine-trained model having fixed weights during the training; using a student version of the machine-trained model to generate a student-model response for the input example; using the student version of the machine-trained model to generate student-model abstract token information, the student-model abstract token information expressing a current state of a dialogue history of a dialogue with fewer tokens than the dialogue history; using the ground-truth response and the student-model response to generate prediction loss; and using the student-model abstract token information to generate sparsity loss.

(A12) According to some implementations of the method of A11, the teacher version of the machine-trained model generates the ground-truth response independent of any instance of abstract token information. The student version of the machine-trained model generates the student-model response based on prior-generated abstract token information.

(A13) According to some implementations of the methods of A11 or A12, the student version of the machine-trained model generates the student-model abstract token information based on the input example, the student-model response, and prior-generated abstract token information.

(A14) According to some implementations of the method of A13, the student version of the machine-trained model also generates the student-model abstract token information based on machine-trained abstract-token-prompting information, the student version of the machine-trained model interpreting the machine-trained abstract-token-prompting information as a signal that the student version of the machine-trained model is to generate the student-model abstract token information.

(B1) According to another aspect, a method (e.g., the process 1102) is described for interacting with a machine-trained model (e.g., the model 106). The method incudes using (e.g., in block 1104) the machine-trained model to generate a response to a first prompt, the first prompt expressing input information for a current dialogue turn of a dialogue and first abstract token information generated in one or more prior dialogue turns. The machine-trained model is trained by successively improving predictive accuracy of the machine-trained model, while rewarding the machine-trained model based on an extent to which the machine-trained model compresses instances of abstract token information. Each instance of abstract token information expresses a current state of a dialogue history of the dialogue with fewer tokens than the dialogue history.

(C1) According to another aspect, a method (e.g., the process 1002) is described for training a machine-trained model (e.g., the model 106). The method includes: using (e.g., in block 1004) a teacher version of the machine-trained model (e.g., the teacher model 506) to generate a ground-truth response for an input example, the teacher version of the machine-trained model having fixed weights during training; using (e.g., in block 1006) a student version of the machine-trained model (e.g., the student model 508) to generate a student-model response for the input example; using (e.g., in block 1008) the student version of the machine-trained model to generate student-model abstract token information; using (e.g., in block 1010) the ground-truth response and the student-model response to generate prediction loss; using (e.g., in block 1012) the student-model abstract token information to generate sparsity loss; and using (e.g., in block 1014) plural instances of the prediction loss and plural instances of the sparsity loss to update the student version of the machine-trained model.

In yet another aspect, some implementations of the technology described herein include a computing system (e.g., the computing system 1302) that includes a processing system (e.g., the processing system 1304) having a processor. The computing system also includes a storage device (e.g., the computer-readable storage media 1306) for storing computer-readable instructions (e.g., information 1308). The processing system executes the computer-readable instructions to perform any of the methods described herein (e.g., any individual method of the methods of A1-A14, B1, or C1).

In yet another aspect, some implementations of the technology described herein include a computer-readable storage medium (e.g., the computer-readable storage media 1306) for storing computer-readable instructions (e.g., the information 1308). A processing system (e.g., the processing system 1304) executes the computer-readable instructions to perform any of the operations described herein (e.g., the operations in any individual method of the methods of A1-A14, B1, or C1).

More generally stated, any of the individual elements and steps described herein are combinable into any logically consistent permutation or subset. Further, any such combination is capable of being manifested as a method, device, system, computer-readable storage medium, data structure, article of manufacture, graphical user interface presentation, etc. The technology is also expressible as a series of means-plus-format elements in the claims, although this format should not be considered to be invoked unless the phrase "means for" is explicitly used in the claims.

As to terminology used in this description, the phrase "configured to" encompasses various physical and tangible mechanisms for performing an identified operation. The mechanisms are configurable to perform an operation using the hardware logic circuitry 1312 of FIG. 13. The term "logic" likewise encompasses various physical and tangible mechanisms for performing a task. For instance, each processing-related operation illustrated in the flowcharts of FIGS. 9-11 corresponds to a logic component for performing that operation.

This description may have identified one or more features as optional. This type of statement is not to be interpreted as an exhaustive indication of features that are to be considered optional; generally, any feature is to be considered as an example, although not explicitly identified in the text, unless otherwise noted. Further, any mention of a single entity is not intended to preclude the use of plural such entities; similarly, a description of plural entities in the specification is not intended to preclude the use of a single entity. As such, a statement that an apparatus or method has a feature X does not preclude the possibility that it has additional features. Further, any features described as alternative ways of carrying out identified functions or implementing identified mechanisms are also combinable together in any combination, unless otherwise noted.

In terms of specific terminology, the term "plurality" or "plural" or the plural form of any term (without explicit use of "plurality" or "plural") refers to two or more items, and does not necessarily imply "all" items of a particular kind, unless otherwise explicitly specified. The term "at least one of" refers to one or more items; reference to a single item, without explicit recitation of "at least one of" or the like, is not intended to preclude the inclusion of plural items, unless otherwise noted. Further, the descriptors "first," "second," "third," etc. are used to distinguish among different items, and do not imply an ordering among items, unless otherwise noted. The phrase "A and/or B" means A, or B, or A and B. The phrase "any combination thereof" refers to any combination of two or more elements in a list of elements. Further, the terms "comprising," "including," and "having" are open-ended terms that are used to identify at least one part of a larger whole, but not necessarily all parts of the whole. A "set" is a group that includes one or more members. The phrase "A corresponds to B" means "A is B" in some contexts. Finally, the terms "exemplary" or "illustrative" refer to one implementation among potentially many implementations.

In closing, the functionality described herein is capable of employing various mechanisms to ensure that any user data is handled in a manner that conforms to applicable laws, social norms, and the expectations and preferences of individual users. For example, the functionality is configurable to allow a user to expressly opt in to (and then expressly opt out of) the provisions of the functionality. The functionality is also configurable to provide suitable security mechanisms to ensure the privacy of the user data (such as data-sanitizing mechanisms, encryption mechanisms, and/or password-protection mechanisms).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for interacting with a machine-trained model over plural dialogue turns of a dialogue using resources of one or more computing systems, comprising:

receiving input information for a current dialogue turn of a dialogue;

generating a first prompt that includes the input information and first abstract token information that has been generated by the machine-trained model in one or more prior dialogue turns;

using the machine-trained model to map the first prompt to a response;

generating a second prompt that includes at least the input information and the response; and using the machine-trained model to map the second prompt to second abstract token information for use in a subsequent dialogue turn, the receiving, generating a first prompt, using the machine-trained model to map the first prompt, generating a second prompt, and using the machine-trained model to map the second prompt being repeated at least one time, wherein the method interleaves generating of responses with generating of abstract token information, each instance of abstract token information expressing a current state of a dialogue history of the dialogue with fewer tokens than a full dialogue history, which reduces a size of a prompt that incorporates said each instance of abstract token information, wherein latency of the machine-trained model and an amount of the resources that are consumed by the machine-trained model depends on sizes of prompts processed by the machine-trained model.

2. The method of claim 1, wherein the machine-trained model has two parts, including a response-generating model part and an abstract-token-generating model part.

3. The method of claim 2, wherein the abstract-token-generating model part has a smaller size, and has fewer weights, than the response-generating model part.

4. The method of claim 3, wherein the abstract-token-generating model part is implemented by a local computing system and the response-generating model part is implemented by a network-accessible computing system.

5. The method of claim 1, wherein the machine-trained model is a language model that includes attention logic for processing input embedding information by determining relevance of a first part of the input embedding information when interpreting a second part of the input embedding information.

6. The method of claim 1, wherein the first abstract token information includes one more abstract tokens generated by the machine-trained model.

7. The method of claim 1, wherein the second prompt also includes the first abstract token information.

8. The method of claim 1, wherein the second prompt also includes machine-trained abstract-token-prompting information, the machine-trained model interpreting the abstract-token-prompting information as a signal that the machine-trained model is to generate the second abstract token information, wherein the abstract-token-prompting information includes one more abstraction tokens, and wherein the first prompt does not include the machine-trained abstract-token-prompting information.

9. The method of claim 1, wherein the input information expresses an input query and text extracted from a document.

10. The method of claim 1, wherein weights of the machine-trained model have been trained by successively improving predictive accuracy of the machine-trained model, while rewarding the machine-trained model based on an extent to which the machine-trained model compresses instances of abstract token information.

11. The method of claim 1, wherein weights of the machine-trained model have been trained by:

using a teacher version of the machine-trained model to generate a ground-truth response for an input example, the teacher version of the machine-trained model having fixed weights during the training;

using a student version of the machine-trained model to generate a student-model response for the input example;

using the student version of the machine-trained model to generate student-model abstract token information, the student-model abstract token information expressing a current state of a dialogue history of a dialogue with fewer tokens than the dialogue history;

using the ground-truth response and the student-model response to generate prediction loss; and using the student-model abstract token information to generate sparsity loss.

12. The method of claim 11, wherein the teacher version of the machine-trained model generates the ground-truth response independent of any instance of abstract token information, and wherein the student version of the machine-trained model generates the student-model response based on prior-generated abstract token information.

13. The method of claim 11, wherein the student version of the machine-trained model generates the student-model abstract token information based on the input example, the student-model response, and prior-generated abstract token information.

14. The method of claim 13, wherein the student version of the machine-trained model also generates the student-model abstract token information based on machine-trained abstract-token-prompting information, the student version of the machine-trained model interpreting the machine-trained abstract-token-prompting information as a signal that the student version of the machine-trained model is to generate the student-model abstract token information.

15. The method of claim 1, wherein weights of the machine-trained model have been trained by:

using a teacher version of the machine-trained model to generate a ground-truth response for an input example, the teacher version of the machine-trained model having fixed weights during training, wherein the teacher version of the machine-trained model generates the ground-truth response independent of any instance of abstract token information, using a student version of the machine-trained model to generate a student-model response for the input example, wherein the student version of the machine-trained model generates the student-model response based on prior-generated abstract token information, using the student version of the machine-trained model to generate student-model abstract token information; and using the ground-truth response, the student-model response, and the student-model abstract token information to generate loss.

16. A computing system for interacting with a machine-trained model, comprising:

an instruction data store for storing computer-readable instructions;

a processing system for executing the computer-readable instructions in the data store, to perform operations including, in an inference stage:

using the machine-trained model to generate a response to a first prompt, the first prompt expressing input information for a current dialogue turn of a dialogue and first abstract token information generated in one or more prior dialogue turns, each instance of abstract token information expressing a current state of a dialogue history of the dialogue with fewer tokens than the dialogue history, wherein the machine-trained model includes weights that have been trained in a training stage by successively improving predictive accuracy of the machine-trained model, while rewarding the machine-trained model based on an extent to which the machine-trained model compresses instances of abstract token information, wherein the weights have been trained in the training stage by:

using a teacher version of the machine-trained model to generate a ground-truth response for an input example, the teacher version of the machine-trained model having fixed weights during training, wherein the teacher version of the machine-trained model generates the ground-truth response independent of any instance of abstract token information, using a student version of the machine-trained model to generate a student-model response for the input example, wherein the student version of the machine-trained model generates the student-model response based on prior-generated abstract token information, using the student version of the machine-trained model to generate student-model abstract token information; and using the ground-truth response, the student-model response, and the student-model abstract token information to generate loss.

17. The computing system of claim 16, wherein the operations further include, in the inference stage, mapping a second prompt to second abstract token information using the machine-trained model, for input to the machine-trained model in a subsequent dialogue turn.

18. The computing system of claim 17, wherein the second prompt also includes machine-trained abstract-token-prompting information, the machine-trained model interpreting the machine-trained abstract-token-prompting information as a signal that the machine-trained model is to generate the second abstract token information.

19. A computer-readable storage medium for storing computer-readable instructions, a processing system executing the computer-readable instructions to perform operations, the operations comprising:

using a teacher version of a machine-trained model to generate a ground-truth response for an input example, the teacher version of the machine-trained model having fixed weights during training;

using a student version of the machine-trained model to generate a student-model response for the input example;

using the student version of the machine-trained model to generate student-model abstract token information;

using the ground-truth response and the student-model response to generate prediction loss;

using the student-model abstract token information to generate sparsity loss; and using plural instances of the prediction loss and plural instances of the sparsity loss to update the student version of the machine-trained model, wherein the teacher version of the machine-trained model generates the ground-truth response independent of any instance of abstract token information, wherein the student version of the machine-trained model generates the student-model response based on prior-generated abstract token information, and wherein the student version of the machine-trained model generates the student-model abstract token information based on the input example, the student-model response, the prior-generated abstract token information, and machine-trained abstract-token-prompting information.

* * * * *